(12) United States Patent
Suda

(10) Patent No.: US 9,621,414 B2
(45) Date of Patent: Apr. 11, 2017

(54) MANAGEMENT SYSTEM FOR MANAGING OPERATION AND METHOD

(75) Inventor: Tadayuki Suda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 518 days.

(21) Appl. No.: 14/359,310

(22) PCT Filed: Mar. 23, 2012

(86) PCT No.: PCT/JP2012/057549
§ 371 (c)(1),
(2), (4) Date: May 20, 2014

(87) PCT Pub. No.: WO2013/140609
PCT Pub. Date: Sep. 26, 2013

(65) Prior Publication Data
US 2014/0317515 A1   Oct. 23, 2014

(51) Int. Cl.
*G06F 3/048* (2013.01)
*H04L 12/24* (2006.01)
(Continued)

(52) U.S. Cl.
CPC .......... *H04L 41/08* (2013.01); *G06F 3/04817* (2013.01); *G06F 3/0605* (2013.01);
(Continued)

(58) Field of Classification Search
CPC ... H04L 41/08; H04L 41/0879; H04L 141/22; G06F 3/04817; G06F 3/0605;
(Continued)

(56) References Cited

U.S. PATENT DOCUMENTS

| | | | |
|---|---|---|---|
| 5,581,691 A * | 12/1996 | Hsu | G06F 9/466 714/15 |
| 7,958,080 B2 * | 6/2011 | Kumar | G06F 17/3089 706/11 |

(Continued)

FOREIGN PATENT DOCUMENTS

| | | |
|---|---|---|
| JP | 2002-041115 A | 2/2002 |
| JP | 2007-102706 A | 4/2007 |

(Continued)

OTHER PUBLICATIONS

JP1/Automatic Job Management System 3, 2011.
(Continued)

*Primary Examiner* — William Bashore
*Assistant Examiner* — Gregory A Distefano
(74) *Attorney, Agent, or Firm* — Mattingly & Malur, PC

(57) ABSTRACT

A management system stores tier relationship information of operational items that configure an operational flow, the execution sequence information, and the operational item type information that indicates whether an operational item that is a lower end of a tier of the operational flow is an automated operational item or a manual execution operational item in the process of an automated work of a computer. The management system determines whether an operational item of a tier that is upper than a tier of the lowest level includes only the automated operational item, only the manual execution operational item, or both for all tiers of the lower level based on the operational item type information and the tier relationship information. The management system controls a display of an icon that indicates a plurality of operational items for the predetermined tier of the operational flow based on the result of the determination.

15 Claims, 29 Drawing Sheets

(51) Int. Cl.
*G06F 3/0481* (2013.01)
*G06Q 10/10* (2012.01)
*G06F 3/06* (2006.01)

(52) U.S. Cl.
CPC ............ *G06F 3/067* (2013.01); *G06F 3/0631* (2013.01); *G06F 3/0685* (2013.01); *G06Q 10/10* (2013.01); *G06Q 10/103* (2013.01); *H04L 41/0879* (2013.01); *H04L 41/22* (2013.01); *G06F 2206/1008* (2013.01)

(58) Field of Classification Search
CPC ...... G06F 3/0631; G06F 3/067; G06F 3/0685; G06F 2206/1008; G06Q 10/10; G06Q 10/103
See application file for complete search history.

(56) References Cited

U.S. PATENT DOCUMENTS

| | | | | |
|---|---|---|---|---|
| 2001/0014877 A1* | 8/2001 | Defrancesco, Jr. | .... | G06Q 10/10 705/38 |
| 2002/0022900 A1 | 2/2002 | Honda | | |
| 2003/0204429 A1* | 10/2003 | Botscheck | ............ | G06Q 10/10 715/738 |
| 2004/0122699 A1* | 6/2004 | Brito | .................... | G06Q 10/103 705/301 |
| 2005/0132048 A1* | 6/2005 | Kogan | .................... | G06Q 10/06 709/225 |
| 2005/0262119 A1* | 11/2005 | Mawdsley | ................ | G06F 8/20 |
| 2006/0111953 A1* | 5/2006 | Setya | .................... | G06Q 10/06 705/7.26 |
| 2006/0123337 A1* | 6/2006 | Koinuma | ............ | G06F 17/3089 715/234 |
| 2007/0008584 A1 | 1/2007 | Kawabuchi et al. | | |
| 2007/0011038 A1 | 1/2007 | Kawabuchi et al. | | |
| 2007/0174342 A1* | 7/2007 | Maeda | ................... | G06Q 10/10 |
| 2008/0033777 A1* | 2/2008 | Shukoor | ............... | G06Q 10/06 705/7.11 |
| 2011/0301996 A1* | 12/2011 | Johnson | ................ | G06Q 10/06 705/7.26 |

FOREIGN PATENT DOCUMENTS

| | | |
|---|---|---|
| JP | 2008-226157 A | 9/2008 |
| JP | 2012-027791 A | 2/2012 |

OTHER PUBLICATIONS

Extended European Search Report received in corresponding European Application No. 12871727.9 dated Sep. 18, 2015.
Written Opinion by International Search Authority (PCT/JP2012/057549), issued on Apr. 17, 2012.
Itochu Techno-Solutions Corporation, "Practical Know-how of Job Management with JP1", Second Edition.

\* cited by examiner

| Operational item B \ Operational item A | Manual execution operational item Manual execution sub flow | Semi-automated sub flow | Automated operational item Automated sub flow |
|---|---|---|---|
| Manual execution operational item Manual execution sub flow | Manual execution flow | Semi-automated flow | Semi-automated flow |
| Semi-automated sub flow | Semi-automated flow | Semi-automated flow | Semi-automated flow |
| Automated operational item Automated sub flow | Semi-automated flow | Semi-automated flow | Automated flow |

| | 1511 | 1512 | 1513 | 1514 | 1515 | 1516 |
|---|---|---|---|---|---|---|
| | Flow ID | Flow name | Flow type | Flow level | Execution estimate time | Request skill level |
| | flow0 | Storage controller Ver. UP flow | - | 0 | 1540 | 6 |
| | flow1 | Host 1 stop flow | Automated | 1 | 140 | 1 |
| | flow2 | Storage controller exchange flow | Manual | 1 | 1000 | 6 |
| | flow3 | Host 1 update & restart flow | Semi-automated | 1 | 400 | 2 |
| | ⋮ | ⋮ | ⋮ | ⋮ | ⋮ | ⋮ |

Fig. 10

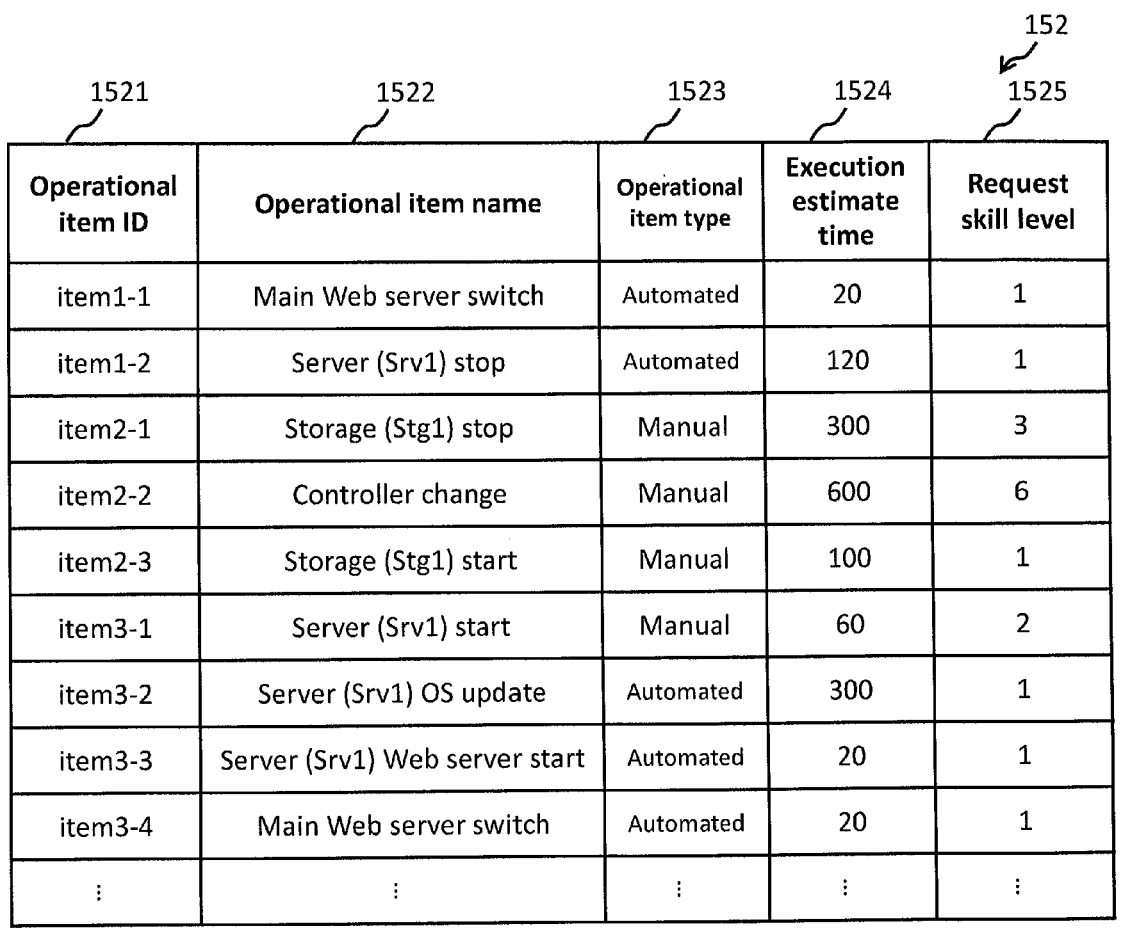

| Operational item ID | Operational item name | Operational item type | Execution estimate time | Request skill level |
|---|---|---|---|---|
| item1-1 | Main Web server switch | Automated | 20 | 1 |
| item1-2 | Server (Srv1) stop | Automated | 120 | 1 |
| item2-1 | Storage (Stg1) stop | Manual | 300 | 3 |
| item2-2 | Controller change | Manual | 600 | 6 |
| item2-3 | Storage (Stg1) start | Manual | 100 | 1 |
| item3-1 | Server (Srv1) start | Manual | 60 | 2 |
| item3-2 | Server (Srv1) OS update | Automated | 300 | 1 |
| item3-3 | Server (Srv1) Web server start | Automated | 20 | 1 |
| item3-4 | Main Web server switch | Automated | 20 | 1 |
| ⋮ | ⋮ | ⋮ | ⋮ | ⋮ |

Fig. 11

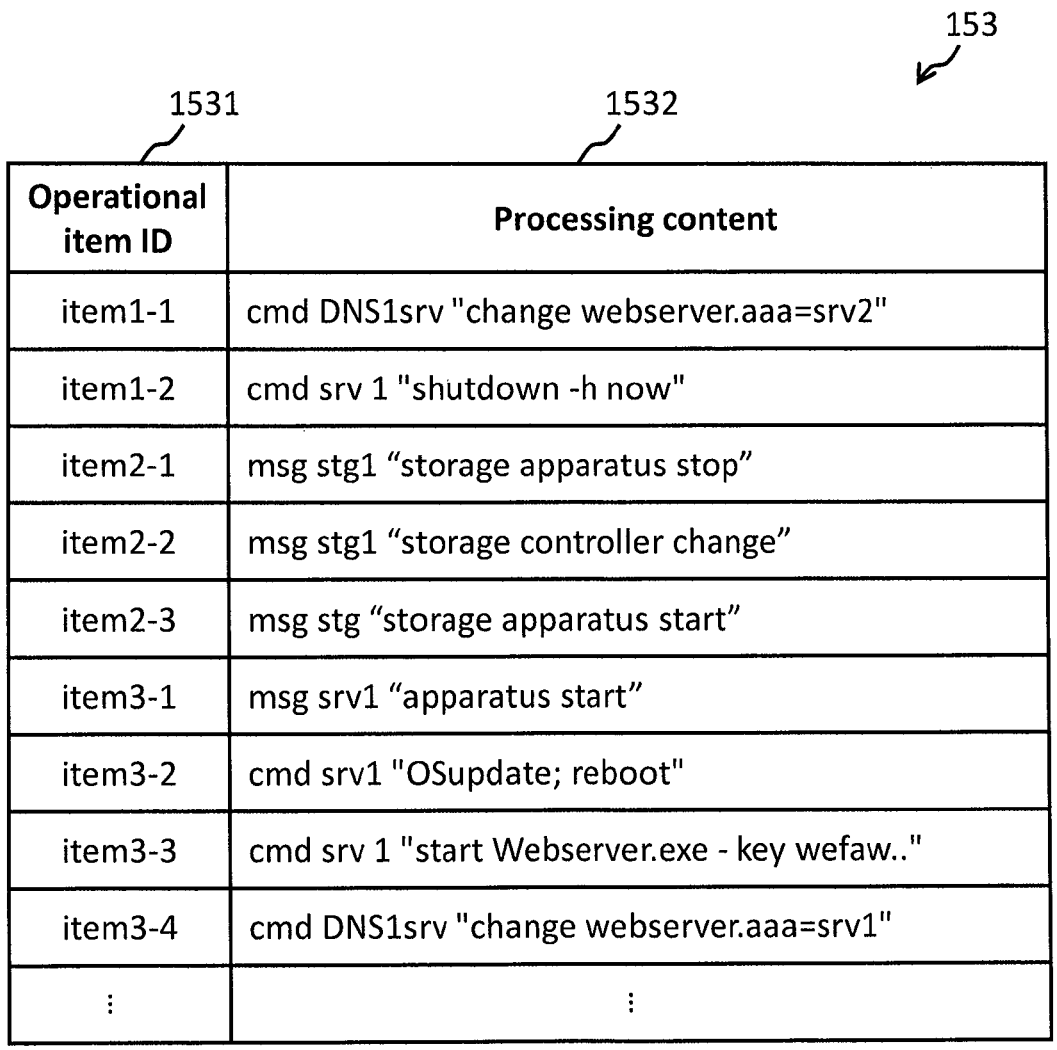

| Operational item ID | Processing content |
|---|---|
| item1-1 | cmd DNS1srv "change webserver.aaa=srv2" |
| item1-2 | cmd srv 1 "shutdown -h now" |
| item2-1 | msg stg1 "storage apparatus stop" |
| item2-2 | msg stg1 "storage controller change" |
| item2-3 | msg stg "storage apparatus start" |
| item3-1 | msg srv1 "apparatus start" |
| item3-2 | cmd srv1 "OSupdate; reboot" |
| item3-3 | cmd srv 1 "start Webserver.exe - key wefaw.." |
| item3-4 | cmd DNS1srv "change webserver.aaa=srv1" |
| ⋮ | ⋮ |

Fig. 12

| Operator ID | Operator name | Skill level |
|---|---|---|
| operator1 | Operator 1 | 1 |
| operator2 | Operator 2 | 5 |
| operator3 | Operator 3 | 9 |
| operator4 | Operator 4 | 3 |
| ⋮ | ⋮ | ⋮ |

Fig. 14

| Flow ID | Operator ID |
|---|---|
| flow1 | operator1 |
| flow2 | operator4 |
| flow3 | operator3 |
| ⋮ | ⋮ |

Fig. 15

| Flow ID | Operational item ID | Icon display color | Display method |
|---|---|---|---|
| flow1 | - | Yellow | Blinking |
| flow1 | Item1-1 | Blue | Lighting |
| flow1 | Item1-2 | Red | Lighting |
| flow1 | Item1-3 | Yellow | Blinking |
| ⋮ | ⋮ | ⋮ | ⋮ |

Fig. 17

MANAGEMENT SYSTEM FOR MANAGING OPERATION AND METHOD

TECHNICAL FIELD

The present invention relates to a computer technique of an operational management.

BACKGROUND ART

From the point of view of an improvement of a service quality and an improvement of work efficiency for a computer system, the needs to an operational automation have been increased. As a technique for managing an operation for instance, Patent Literature 1 discloses a technique in which a display method of a work flow capable of displaying a status of the processing contents to a user is provided, a plurality of simple boxes in which the processing contents to a document are defined is coupled to each other and each of the processing is executed for the simple boxes that have been coupled in accordance with the predetermined sequence for a display method of a work flow system, "BOX C" on the work flow in which an execution of the processing contents has been terminated is displayed with a diagonal line, and a sand clock mark is displayed for "BOX D" in which the processing contents are being executed. The "box" is a logical existence in which a document is stored and a processing that is associated with the stored document is configured in advance for a document processing apparatus such as a complex machine (MFP: Multi Function Peripheral) that is configured to implement the functions of a print, a fax, a copy and so on.

CITATION LIST

Patent Literature

[PTL 1]
Japanese Patent Application Laid-Open Publication No. 2007-102706

SUMMARY OF INVENTION

Technical Problem

It is difficult to automate all of the operational management works for a computer system for a wide variety of reasons. As such a case, there are a case where it is necessary that an operator carries out a physical work such as an insertion and a removal of a cable and a case where a visual check by an operator is necessary for instance. Moreover, there are a case where an operation cannot be executed from an automated program even for an operation on a computer and a case where the processing contents for the automation cannot be determined in a precise manner in such a manner that the processing contents can be programmed.

A technique for carrying out an operational management without any difficulty and in an appropriate manner by a manager is required under the condition that it is difficult to automate the operational management work for a computer system as described above.

Solution to Problem

A management system stores the tier relationship information that indicates a tier relationship of the plurality of operational items that configure an operational flow, the execution sequence information that indicates an execution sequence of the plurality of operational items, and the operational item type information that indicates whether an operational item that is a lower end of a tier of the operational flow is an automated operational item that is executed only by a computer or a manual execution operational item that is executed via a human person in the process of an automated work of a computer. The management system determines whether an operational item of a tier that is upper than a tier of the lowest level includes only the automated operational item, only the manual execution operational item, or both of the automated operational item and the manual execution operational item for all tiers of the lower level based on the operational item type information and the tier relationship information. When displaying an icon that indicates a plurality of operational items for the predetermined tier of the operational flow, the management system locates an icon that indicates each of the plurality of operational items in accordance with the execution sequence based on the execution sequence information. In the case where an operational item that is indicated by the icon includes only the automated operational item, the management system displays the icon by a first icon that indicates that. In the case where an operational item that is indicated by the icon includes only the manual execution operational item, the management system displays the icon by a second icon that indicates that. In the case where an operational item that is indicated by the icon includes the manual execution operational item and the automated operational item, the management system displays the icon by a third icon that indicates that.

BRIEF DESCRIPTION OF DRAWINGS

FIG. 9 is a view for illustrating a type of a flow in accordance with an embodiment of the present invention.

FIG. 10 is a view showing an example of the flow detailed information in accordance with an embodiment of the present invention.

FIG. 11 is a view showing an example of the operational item information in accordance with an embodiment of the present invention.

FIG. 12 is a view showing an example of the operational item processing information in accordance with an embodiment of the present invention.

FIG. 14 is a view showing an example of the operator information in accordance with an embodiment of the present invention.

FIG. 15 is a view showing an example of the operator allocation information in accordance with an embodiment of the present invention.

FIG. 17 is a view showing an example of the icon progress display information in accordance with an embodiment of the present invention.

DESCRIPTION OF EMBODIMENTS

Figure 1:
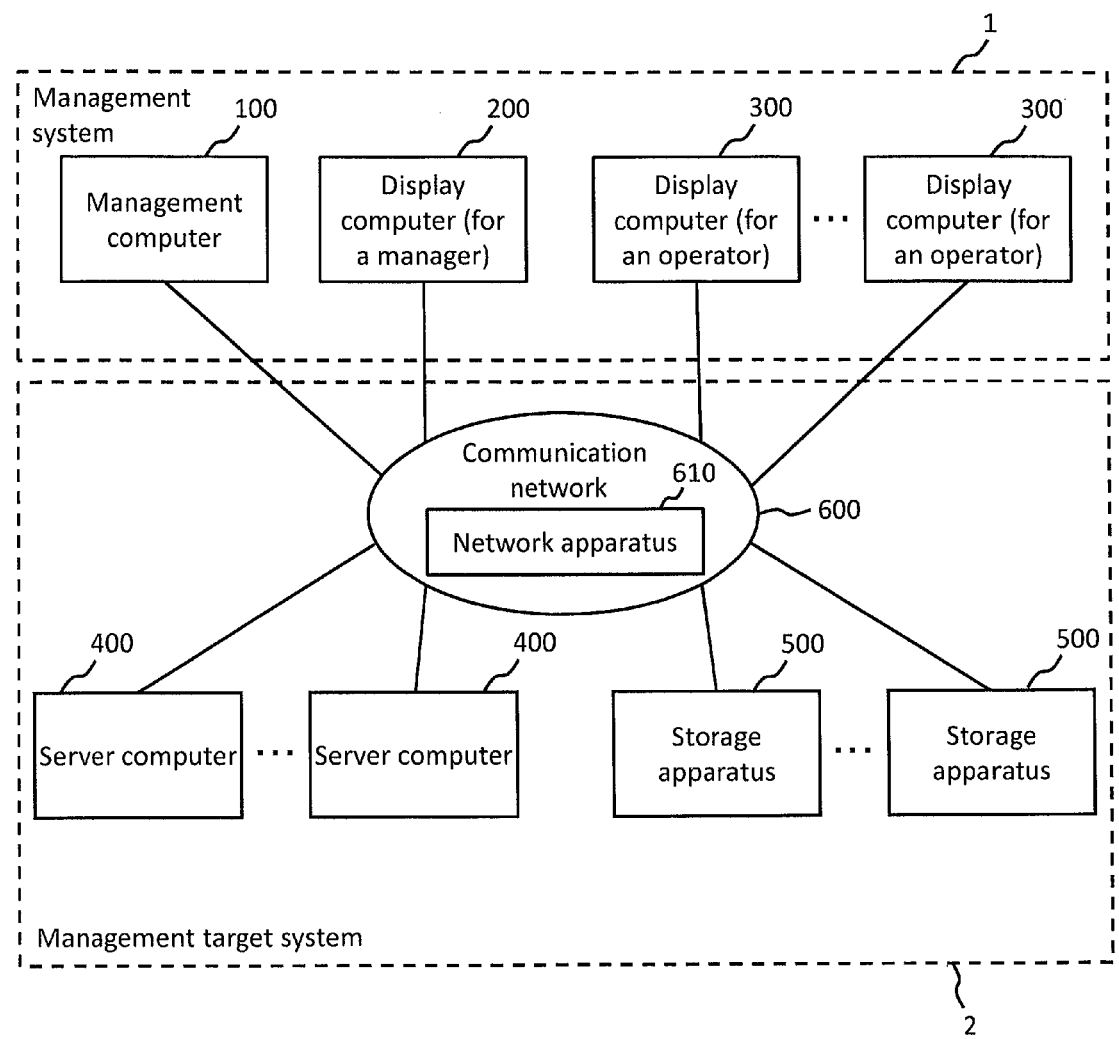
FIG. 1 is a configuration diagram showing an information processing system in accordance with an embodiment of the present invention.

An embodiment of the present invention will be described below in detail with reference to the drawings. The embodiment that will be described in the following do not restrict the present invention in accordance with the claims, and all of elements and combinations thereof that will be described in the embodiment are not necessarily essential for means for solving the problems of the invention. In the drawings, the equivalent symbols and numbers indicate equivalent composition elements through a plurality of drawings.

In the following descriptions, while the information in accordance with the present embodiment will be described in the expression such as "aaa table" in some cases, the information can be represented by other than the data structure such as a table, a list, a DB, and a queue. In order to indicate that the information is not depended on a data structure, the expression of "aaa table" can also be referred to as "aaa information" in some cases.

In the case where the contents of the information are described, the expressions of "identification information", "identifier", "name", and "ID" are used. The expressions can be substituted for each other.

In the following descriptions, the processing will be described while a "program" and a "module" are handled as a subject in some cases. In the case where the program and a module are executed by a processor, the processor executes the predetermined processing by using a memory and a communication port as it decides proper. Consequently, a subject of a processing can also be a processor. The processing that is disclosed while a program and a module are handled as a subject can also be a processing that is executed by a computer such as a management computer. Moreover, a part or a whole of a program can be implemented by the dedicated hardware. A wide variety of programs can be installed to each of the computers by a program distribution server or a storage medium that can be read by a computer for instance.

Hereafter, an aggregate of at least one computer that is configured to manage a computer system and to display the display information may be called a management system in some cases. In the case where a management computer displays the display information, the management computer is a management system. Moreover, a combination of the management computer and a display computer is also a management system. A processing that is equivalent to the management computer can also be implemented by using a plurality of computers for speeding up and increasing reliability for a management processing. In this case, the plurality of computers is a management system (in the case where a display is executed by the display computer, the display computer can also be included in the plurality of computers).

An example of a specific problem in accordance with the present embodiment will be briefly described in the following.

An automation of all flows for an operational flow is difficult. There are an automated flow that includes only work by a computer, a manual execution flow that includes only work that is carried out by a human person, and a semi-automated flow that includes an automated work that is carried out by a computer and a manual work that is carried out by a human person in a flow for instance. Consequently, it is necessary for a manager to discriminate three kinds of flows (an automated flow, a semi-automated flow, and a manual execution flow) and to carry out an allocation of a work (a flow) to an operator and a progress management. A work that is associated with the allocation and the progress management becomes a load to a manager.

An embodiment of the present invention will be described below in detail.

FIG. 1 is a configuration diagram showing a computer system in accordance with an embodiment of the present invention.

A computer system is provided with a management system 1 that is configured to manage an operational flow and a management target system 2 that is a target that is managed by the management system 1. The management system 1 is provided with a management computer 100, a display computer 200 for a manager who manages an operational flow (hereafter referred to as a display computer for a manager), and at least one display computer 300 for an operator (hereafter referred to as a display computer for an operator). The management target system 2 is provided with at least one server computer 400, at least one storage apparatus 500, and a communication network 600 such as a LAN (Local Area Network). The communication network 600 is configured by at least one network apparatus 610. The management computer 100, the display computer 200 for a manager, the display computer 300 for an operator, the server computer 400, and the storage apparatus 500 are coupled to each other via the communication network 600.

Figure 2:
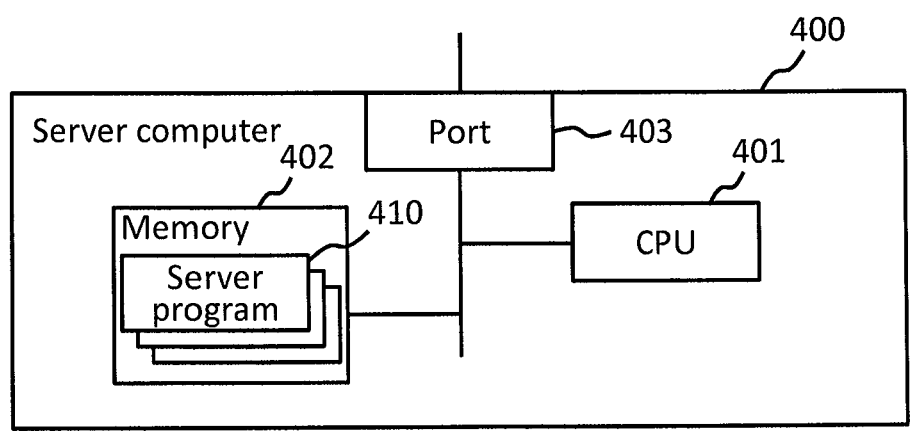
FIG. 2 is a configuration diagram showing an example of a server computer in accordance with an embodiment of the present invention.

FIG. 2 is a configuration diagram showing an example of a server computer in accordance with an embodiment of the present invention.

The server computer 400 is configured to execute a server program or the like and to provide a predetermined service such as a supply service of an iSCSI (Internet Small Computer System Interface) volume, a file sharing service, and a Web service. The server computer 400 is provided with a CPU (Central Processing Unit) 401, a memory 402, and a port 403. The CPU 401, the memory 402, and the port 403 are coupled to each other via an internal bus. The CPU 401 is configured to execute a program that is stored in the memory 402. The memory 402 is configured to store a server program 410 for executing a processing that provides a predetermined service for instance. The port 403 is an interface device for coupling to the communication network 600.

Figure 3:
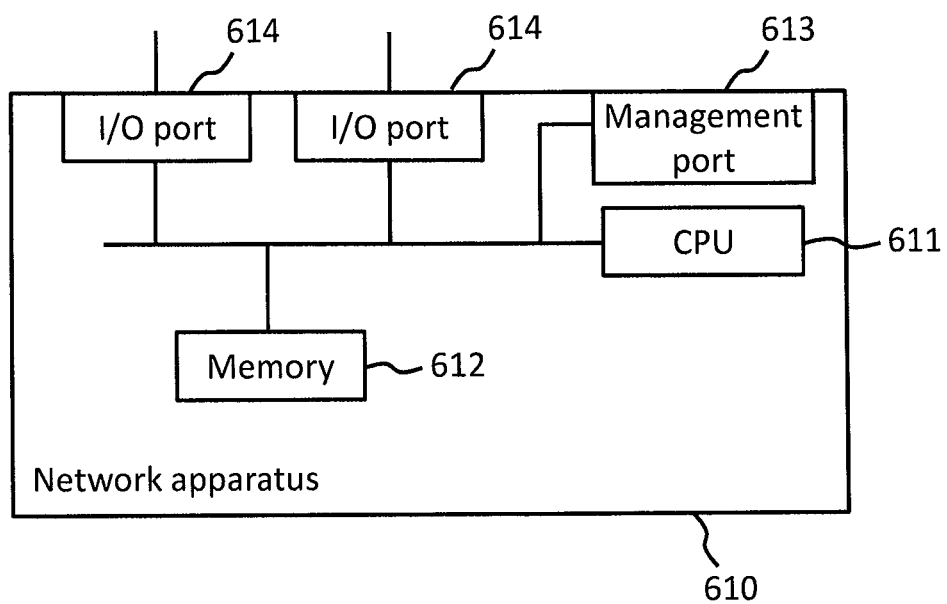
FIG. 3 is a configuration diagram showing an example of a network apparatus in accordance with an embodiment of the present invention.

FIG. 3 is a configuration diagram showing an example of a network apparatus in accordance with an embodiment of the present invention.

The network apparatus 610 is an IP switch or a router for instance. The network apparatus 610 is provided with a CPU 611, a memory 612, a management port 613, and a plurality of input/output (I/O) ports 614. The CPU 611, the memory 612, the management port 613, and the I/O ports 614 are coupled to each other via an internal bus. The management port 613 is an interface device for coupling to a communication line in the communication network 600 and is configured to be used in the case where an input/output of the management data such as the configuration information is executed in large part. The I/O ports 614 is an interface device for coupling to a communication line in the communication network 600 and is configured to be used in the case where an input/output of the user data such as the data that is written to a volume of the storage apparatus 500 and the data that is read from a volume of the storage apparatus 500 is executed in large part.

Figure 4:
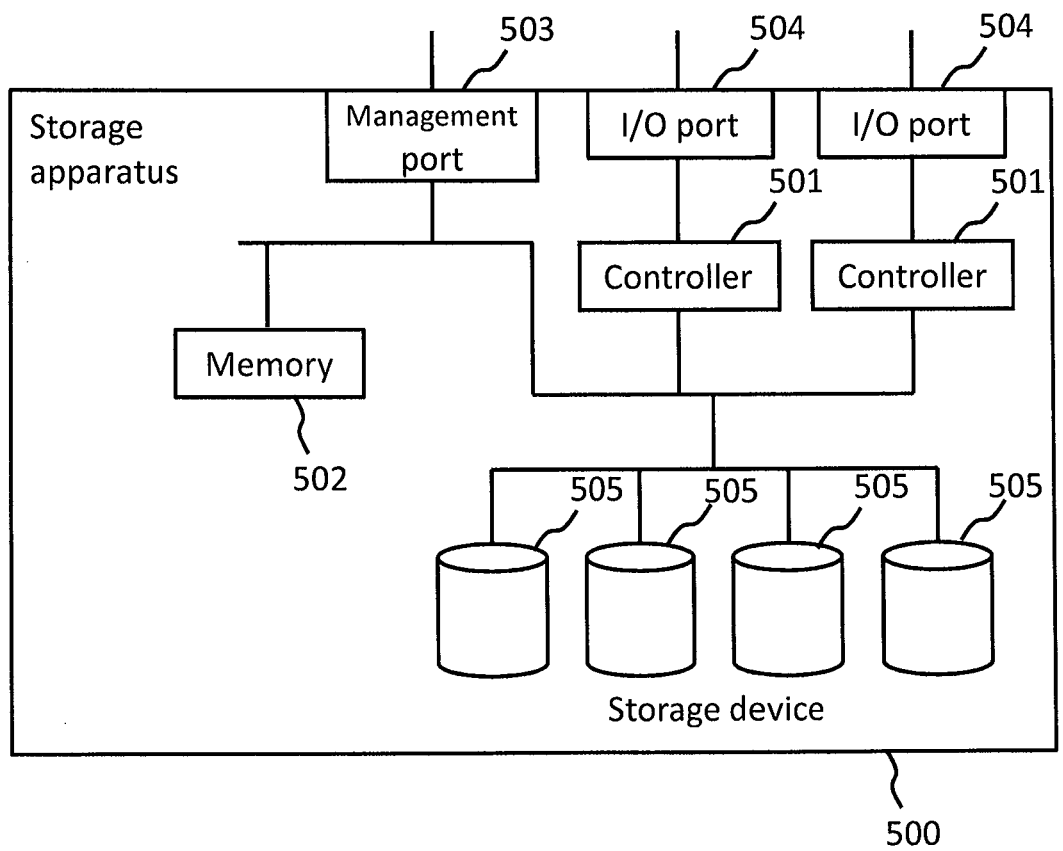
FIG. 4 is a configuration diagram showing an example of a storage apparatus in accordance with an embodiment of the present invention.

FIG. 4 is a configuration diagram showing an example of a storage apparatus in accordance with an embodiment of the present invention.

The storage apparatus 500 is configured to provide a storage area to the server computer 400 or the like. The storage apparatus 500 is provided with at least one controller 501, a memory 502, a management port 503, at least one I/O port 504, and at least one storage device 505. The management port 503 is an interface device for coupling to the communication network 600 and is configured to be used in the case where an input/output of the management data is executed in large part. The I/O port 504 is an interface device for coupling to the communication network 600 and is configured to be used in the case where an input/output of the user data is executed in large part. The storage device 505 can be any one of a hard disk drive, a solid storage medium, and an optical storage medium, or can be a storage medium of other type. The storage apparatus 500 provides a storage area of the storage device 505 to the server computer 400 or the like.

Figure 5:
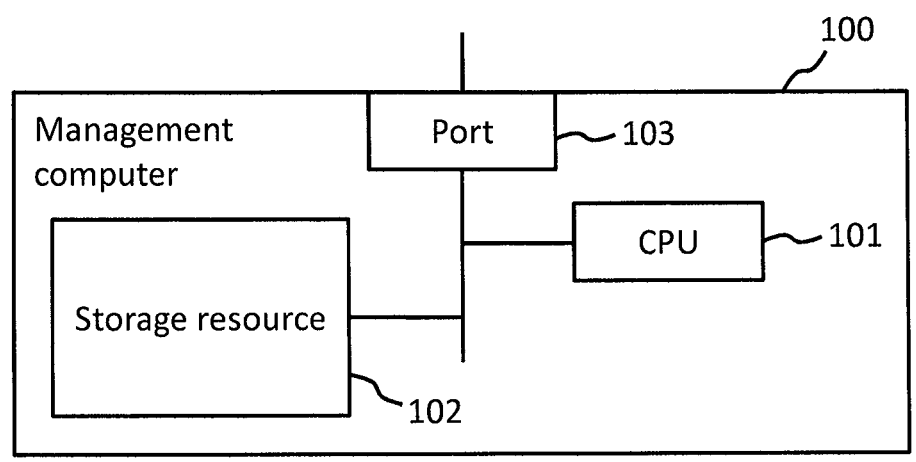
FIG. 5 is a configuration diagram showing an example of a management computer in accordance with an embodiment of the present invention.

FIG. 5 is a configuration diagram showing an example of a management computer in accordance with an embodiment of the present invention.

The management computer 100 is configured to manage the management target system 2. The management computer 100 is a versatile computer for instance and is provided with a CPU 101, a storage resource 102, and a port 103. The CPU 101, the storage resource 102, and the port 103 are coupled to each other via an internal bus. The CPU 101 is configured to execute a program that is stored in the storage resource 102. The storage resource 102 can be a memory, a secondary storage apparatus such as a hard disk drive (HDD), or a combination of a memory and a secondary storage apparatus. The storage resource 102 is configured to store a program that is executed by the CPU 101 and a wide variety of information that is used by the CPU 101. The port 103 is an interface device for coupling to the communication network 600.

Figure 6:
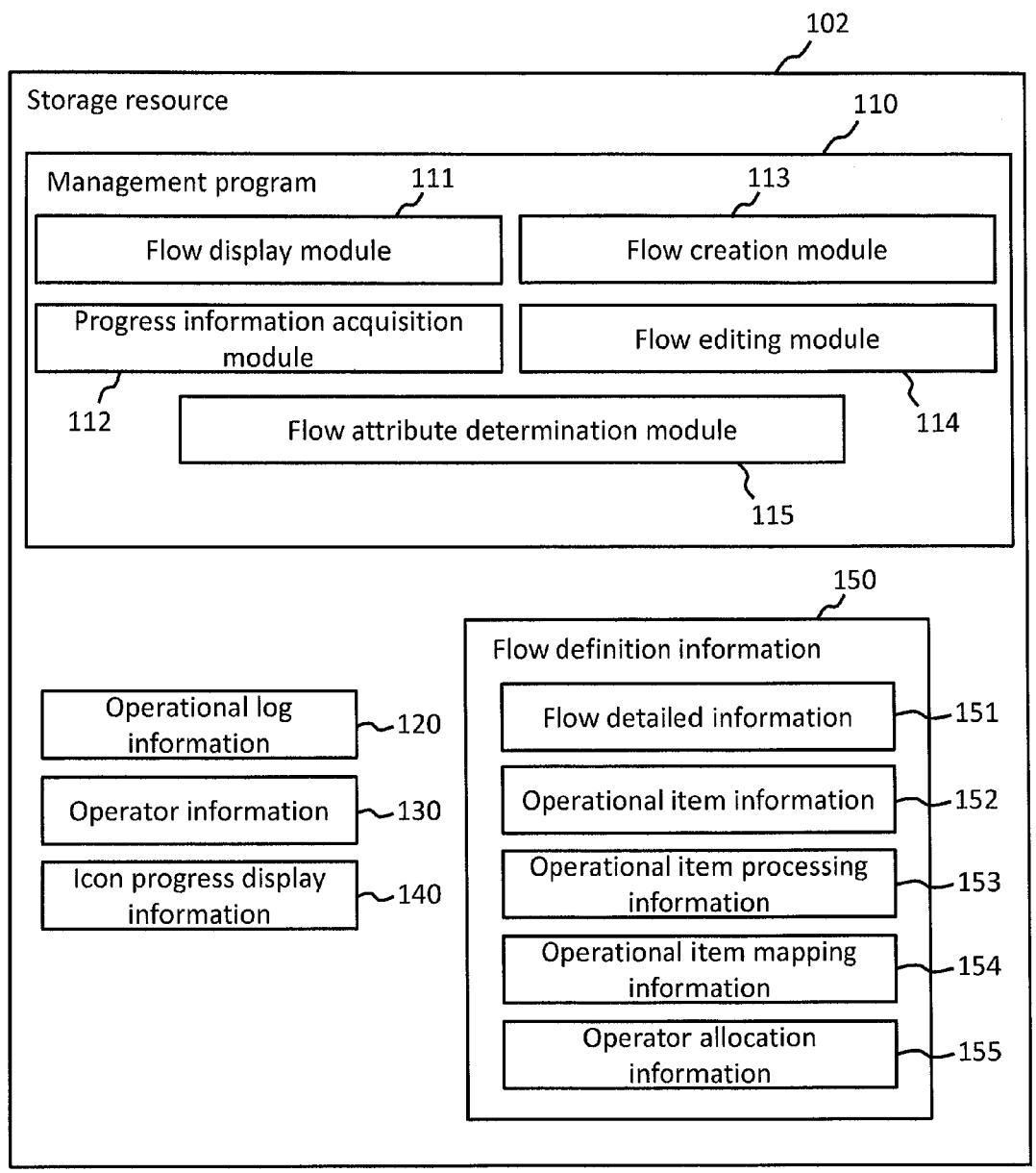
FIG. 6 is a view showing an example of an internal configuration of a storage resource of a management computer in accordance with an embodiment of the present invention.

FIG. 6 is a view showing an example of an internal configuration of a storage resource of a management computer in accordance with an embodiment of the present invention.

The storage resource 102 of the management computer 100 is configured to store the management program 110, the operational log information 120 as an example of the log information, the operator information 130, the icon progress display information 140, and the flow definition information 150.

The management program 110 includes a flow display module 111, a progress information acquisition module 112, a flow creation module 113, a flow editing module 114, and a flow attribute determination module 115. The flow display module 111 is a module for executing a processing for displaying an operational flow that is executed to manage the management target system 2 (hereafter simply referred to as a flow) to the display computer (the display computer 200 for a manager and the display computer 300 for an operator). The progress information acquisition module 112 is a module for executing a processing for acquiring the progress information of a flow. The flow creation module 113 is a module for executing a processing for creating a flow. The flow editing module 114 is a module for executing a processing for editing a flow. The flow attribute determination module 115 is a module for executing a processing for determining a type of a flow and a request skill level.

Moreover, the management program 110 includes an input information receiving module, a log information receiving module, an operator management module, an operator information acquisition module, a display screen information transmitting module, and an operator allocation module that are not shown in the figure. The input information receiving module is a module for executing a processing for receiving the input information from a manager or an operator to the display computer 200 and the display computer 300 from the display computer 200 and the display computer 300. The log information receiving module is a module for executing a processing for receiving an operational log that is transmitted from the display computer 300 for an operator and for registering the operational log to the operational log information 120. The operator management module is configured to manage an operator. More specifically, the operator management module is a module for executing a processing for adding an entry to the operator information 130 or for deleting or modifying an entry of the operator information 130. The operator information acquisition module is a module for executing a processing for acquiring the information that is registered to the operator information 130. The display screen information transmitting module is a module for executing a processing for transmitting the screen information that is created by the management computer 100 to the display computer 200 and the display computer 300. The operator allocation module is a module for executing a processing for allocating an operator to a work item that is to be executed for an operation of the management target system 2 (hereafter referred to as an operational item).

It is not always necessary that the management program 110 is provided with a module structure. The management program 110 can be provided with any structure as long as a processing by each module can be implemented. The management program 110 is executed by the CPU 101 of the management computer 100.

The flow definition information 150 includes the flow detailed information 151, the operational item information 152 as an example of the operational item information, the operational item processing information 153, the operational item mapping information 154 as an example of the tier relationship information and the execution sequence information, and the operator allocation information 155. The details of the information 120, 130, 140, 150, and 151 to 155 that are stored in the storage resource 102 will be described later.

Figure 7:
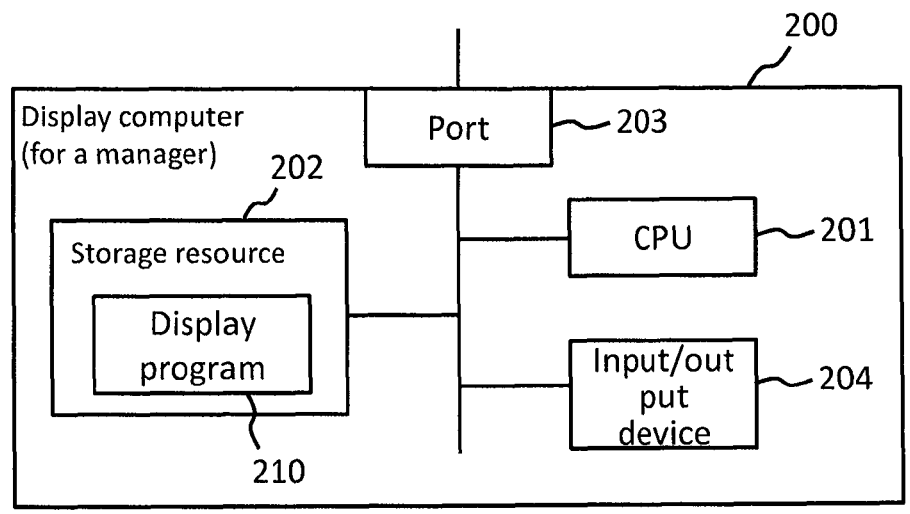
FIG. 7 is a configuration diagram showing an example of a display computer for a manager in accordance with an embodiment of the present invention.

FIG. 7 is a configuration diagram showing an example of a display computer for a manager in accordance with an embodiment of the present invention.

The display computer 200 for a manager is a computer for outputting a wide variety of information that is associated with a management of the management target system 2 and for inputting a wide variety of indications by a manager. The display computer 200 for a manager is a versatile computer for instance and is provided with a CPU 201, a storage resource 202, a port 203, and an input/output device 204. The CPU 201, the storage resource 202, the port 203, and the input/output device 204 are coupled to each other via an internal bus.

The CPU 201 is configured to execute a program that is stored in the storage resource 202. The storage resource 202 can be a memory, a secondary storage apparatus such as a hard disk drive (HDD), or a combination of a memory and a secondary storage apparatus. The storage resource 202 is configured to store a display program 210 for executing a processing for outputting a wide variety of information that is associated with a management of the management target system 2. In the present embodiment, the display program 210 is configured to execute a processing for displaying a screen based on the screen information that has been received, creating a wide variety of information in accordance with an operation by an input/output apparatus to a screen that has been displayed, and transmitting the information to the management computer 100. The port 203 is an interface device for coupling to the communication network 600. The input/output device 204 is an interface device for coupling to an input/output apparatus (such as a display, a keyboard, and a mouse). An input/output apparatus is coupled to the display computer 200 for a manager via the input/output device 204. The display computer 200 for a manager can also be provided with an input/output apparatus such as a display.

Figure 8:
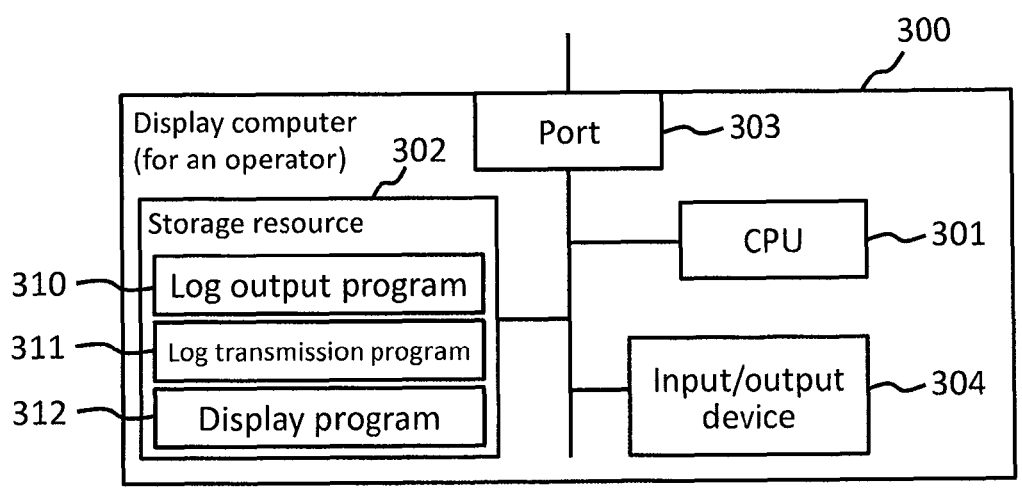
FIG. 8 is a configuration diagram showing an example of a display computer for an operator in accordance with an embodiment of the present invention.

FIG. 8 is a configuration diagram showing an example of a display computer for an operator in accordance with an embodiment of the present invention.

The display computer 300 for an operator is a computer that is used by an operator who executes or manages an operational item. The display computer 300 for an operator is a versatile computer for instance and is provided with a CPU 301, a storage resource 302, a port 303, and an input/output device 304. The CPU 301, the storage resource 302, the port 303, and the input/output device 304 are coupled to each other via an internal bus.

The CPU 301 is configured to execute a program that is stored in the storage resource 302. The storage resource 302 can be a memory, a secondary storage apparatus such as a hard disk drive (HDD), or a combination of a memory and a secondary storage apparatus. The storage resource 302 is configured to store a log output program 310, a log transmission program 311, and a display program 312. The log output program 310 is a program for outputting an operational log that is associated with an execution of an operational item. The log transmission program 311 is a program for transmitting an operational log that is associated with an execution of an operational item to the management computer 100. More specifically, the log transmission program 311 transmits an operational log for every operational item to the management computer 100 for instance. The display program 312 is a program for displaying and outputting a wide variety of information. In the present embodiment, the display program 312 is configured to execute a processing for displaying a screen based on the screen information that has been received, creating a wide variety of information in accordance with an operation by an input/output apparatus to a screen that has been displayed, and transmitting the information to the management computer 100. The port 303 is an interface device for coupling to the communication network 600. The input/output device 304 can be an apparatus such as a display, a keyboard, and a mouse, or can be an interface device for coupling to the apparatus.

The words and terms that are used in the present embodiment will be described in the following.

In the present embodiment, a flow that is executed to manage the management target system 2 is defined for the management computer 100. The "flow" includes a plurality of work items (operational items) that are to be executed in an operation of the management target system 2 and includes the execution sequence of a plurality of operational items. In the present embodiment, a flow can define a plurality of operational items as a tier structure.

In the flow, an operational item that includes a plurality of operational items in a lower level (referred to as a flow of a lower level or a sub flow) can be included.

An operational item of a lower end in a flow is a minimum unit of a work for instance, and can be corresponded to a work such as a stoppage of the server computer 400, an update of an OS (Operating System) of the server computer 400, an exchange of the controller 501 of the storage apparatus 500.

An operational item of a lower end can be classified into two kinds of an operational item that can be executed by a computer (hereafter referred to as an automated operational item) and an operational item that is required to be determined and operated via an operator in the process of an automated execution (hereafter referred to as a manual execution operational item).

On the other hand, an operational item of an upper level (a sub flow) can be classified into three kinds of an automated flow, a semi-automated flow, and a manual execution flow. The automated flow is a flow in which only an automated operational item exists in a plurality of operational items of a lower end that are in a lower level of the flow. From the aspect of a next tier below, the automated flow is a flow in which only an automated operational item and/or an automated flow exist. The semi-automated flow is a flow in which an automated operational item and a manual execution operational item exist in a plurality of operational items of a lower end that are in a lower level of the flow. From the aspect of a next tier below, the semi-automated flow is a flow that includes both of an automated operational item and/or an automated flow and a manual execution operational item and/or a manual execution flow, or at least one semi-automated flow. The manual execution flow is a flow in which only a manual execution operational item exists in a plurality of operational items of a lower end that are in a lower level of the flow. From the aspect of a next tier below, the manual execution flow is a flow in which only a manual execution operational item and/or a manual execution flow exist.

FIG. 9 is a view for illustrating a type of a flow in accordance with an embodiment of the present invention.

The figure is a view for illustrating a relationship between a type of a flow of an upper level that includes two operational items of an operational item A and an operational item B in a next tier below and a type of an operational item A and an operational item B. A type of an operational item A is indicated on a horizontal axis, a type of an operational item B is indicated on a vertical axis, and a type of a flow of an upper level is indicated at a position that is corresponded to those.

That is to say, in the case where an operational item A is a manual execution operational item or a manual execution sub flow and an operational item B is a manual execution operational item or a manual execution sub flow, a type of a flow of an upper level that includes the two operational items is a manual execution flow. In the case where an operational item A is an automated operational item or an automated sub flow and an operational item B is an automated operational item or an automated sub flow, a type of a flow of an upper level that includes the two operational items is an automated flow. In the case where an operational item A and an operational item B are provided with a relationship other than the above, a type of a flow of an upper level that includes the two operational items is a semi-automated flow.

In the following, a flow of the highest level is referred to as a "level-0 flow" for descriptive purposes, a sub flow (an operational item) that is included in the level-0 flow, that is, a sub flow in a next tier below to a level 0 is referred to as a "level-1 flow" (or a "level-0 operational item"), and a sub flow (an operational item) that is included in the level-1 flow is referred to as a "level-2 flow" in some cases.

The following flow is thought as a flow for managing the management target system 2.

(Level-0 flow): an aggregate of work items (operational items) that are to be executed by a manager who is responsible for the total management of the management target system 2 as a series of operational works. As a level-0 flow, an aggregate of a plurality operational items are thought in the case where a controller of the storage apparatus 500 that is used by the server computer 400 is exchanged without an occurrence of a failure of the server computer 400.

(Level-1 flow): a flow of a tier (level-1) next below (immediately beneath) to a level-0 flow. In the case where the number of operational items that are included in a tier immediately below a level-0 flow becomes large, a visibility and a workability of a manager are deteriorated. The level-1 flow is introduced for the purpose of reducing the number of operational items that are included in a tier immediately below a level-0 flow. A plurality of level-1 flows is included in the level-0 flow in the elementary sense. A plurality of operational items that are included in the level-1 flow are assumed to be allocated to one charged subject (one team that includes one operator or a plurality of operators, hereafter simply referred to as an "operator" in some cases). This is because, in the case where a charged subject for every level-1 flow is allocated, if a problem occurrence (a progress delay or the like) happens for an operational item that is included in the level-1 flow, a manager can determine which charged subject is to be made an inquiry to without any difficulty. In the case where one team is allocated to the level-1 flow, the management computer 100 can also manage in such a manner that an operator in the team is allocated to a level-2 flow that is a flow of a tier next below to the level-1 flow.

It is not necessary that all operational items of one charged subject are included and managed in one level-1 flow. For instance, it is also thought that a level-1 flow is prepared as a part in advance. In this case, in the case where an existing part is used, the time and effort of a flow creation can be reduced. For instance, in the case where four flows (1) to (4) exist as an operational item of the level-0 flow (the level-1 flow), it is also possible that the flows (1) to (3) are corresponded to an operator 1 and the flow (4) is corresponded to an operator 2. As a matter of course, in the case where the flows (1) to (3) are one level-1 flow, since a charged subject that has been allocated is managed for every level-1 flow, a charged subject that has been allocated can be clear because a correspondence between the level-1 flow and the charged subject becomes apparent. However, creating the level-1 flow that includes a flow that is taken under the charge by the same charged subject as an operational item of the level-0 flow requires great care since an existing part cannot be used. Consequently, the creation is not essential.

A wide variety of information that is stored into the storage resource 102 of the management computer 100 will be described in detail in the following.

FIG. 10 is a view showing an example of the flow detailed information in accordance with an embodiment of the present invention.

The flow detailed information 151 is configured by a table for instance and is provided with a record that includes the fields of a flow ID 1511, a flow name 1512, a flow type 1513, a flow level 1514, an execution estimate time 1515, and a request skill level 1516.

The flow ID 1511 stores an ID (a flow ID) that identifies a flow. Here, a flow that is a target includes a total flow and a sub flow (an example of an operational item) in a flow. The flow name 1512 stores a name of a corresponded flow (a flow name). The flow name is a name by which an overview of the contents of a corresponded flow can be indicated for instance. The flow type 1513 stores a type of a corresponded flow. As a type of a flow, any one of "automated" that indicates an automated flow, "semi-automated" that indicates a semi-automated flow, and "manual" that indicates a manual execution flow is set. Nothing is set to a flow of the highest level (a total flow). The flow level 1514 stores a level that indicates a tier in a total flow of a corresponded flow (a flow level). In the present embodiment, a flow level of a tier of the highest level is "0", and as a level of a tier is lower, the number of a level is larger. The execution estimate time 1515 stores a time that is an estimate for completing an execution of a corresponded flow (an execution estimate time). The request skill level 1516 stores a level of a skill that is required for executing a corresponded flow (a skill level). In the present embodiment, the request skill level 1516 stores the highest skill level in skill levels that are required for executing a plurality of operational items of a lower level of the flow.

In accordance with a second record of the flow detailed information 151, it is found that a flow ID of a corresponded flow is "flow1", a flow name is "host 1 stop flow", a flow type is "automated", a flow level is "1", an execution estimate time is 140 seconds, and a skill level that is required is "1"

FIG. 11 is a view showing an example of the operational item information in accordance with an embodiment of the present invention.

The operational item information 152 is configured by a table for instance and is provided with a record that includes the fields of an operational item ID 1521, an operational item name 1522, an operational item type 1523, an execution estimate time 1524, and a request skill level 1525.

The operational item ID 1521 stores an ID (an operational item ID) that identifies an operational item. In the present embodiment, an operational item that the table targets is an operational item of the lower end in a flow and a sub flow is not included. The operational item name 1522 stores a name of a corresponded operational item (an operational item name). The operational item name is a name by which an overview of the contents of a corresponded operational item can be indicated for instance. The operational item type 1523 stores a type of a corresponded operational item. As a type of an operational item, any one of "automated" that indicates an automated operational item and "manual" that indicates a manual execution operational item is set. The execution estimate time 1524 stores a time that is an estimate for completing an execution of a corresponded operational item (an execution estimate time). The request skill level 1525 stores a level of a skill that is required for executing a corresponded operational item (a skill level).

In accordance with a first record of the operational item information 152, it is found that an operational item ID of a corresponded operational item is "item1-1", an operational item name is "main Web server switch", an operational item type is "automated", an execution estimate time is 20 seconds, and a skill level that is required is "1"

FIG. 12 is a view showing an example of the operational item processing information in accordance with an embodiment of the present invention.

The operational item processing information 153 is configured by a table for instance and is provided with a record that includes the fields of an operational item ID 1531 and a processing content 1532. The operational item ID 1531 stores an operational item ID of a corresponded operational item. In the present embodiment, an operational item that the table targets is an operational item of the lower end in a flow and a sub flow is not included. The processing content 1532 stores a processing content of a corresponded operational item.

Figure 13:
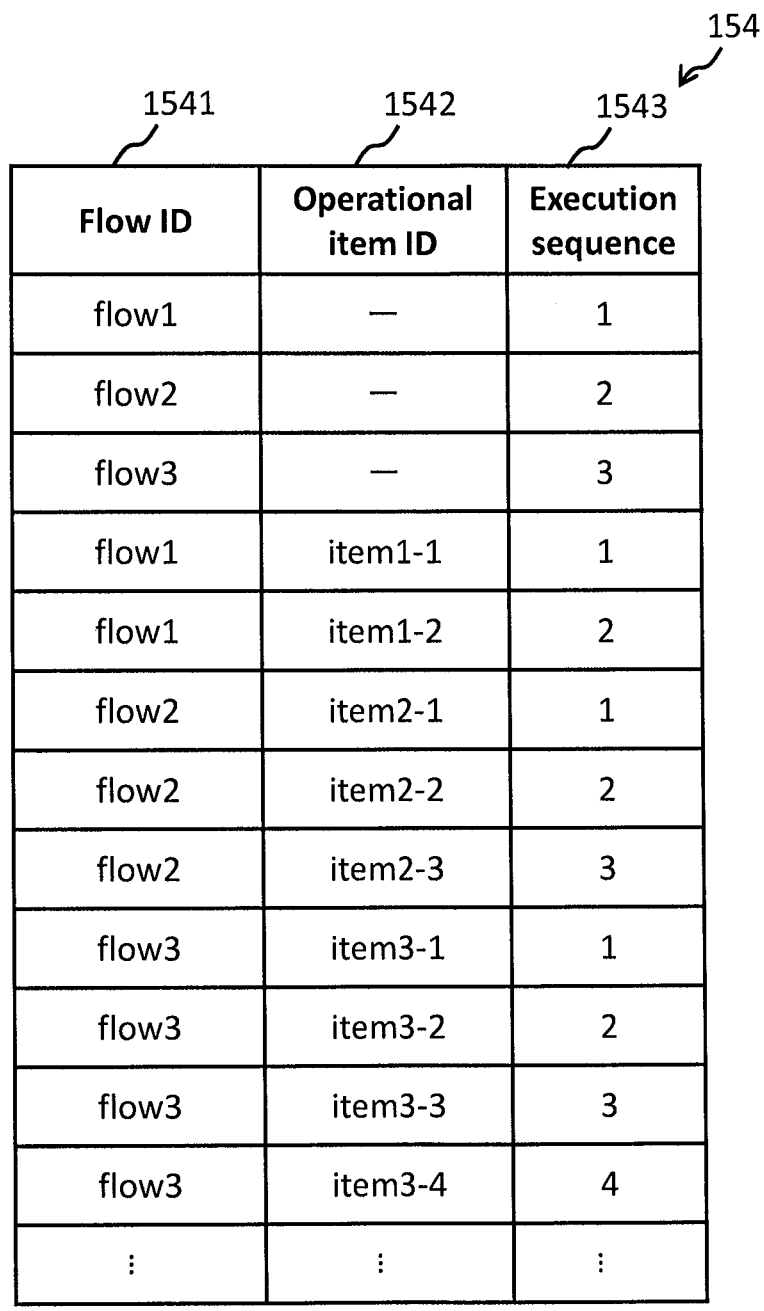
FIG. 13 is a view showing an example of the operational item mapping information in accordance with an embodiment of the present invention.

FIG. 13 is a view showing an example of the operational item mapping information in accordance with an embodiment of the present invention.

The operational item mapping information 154 is configured by a table for instance and is provided with a record that includes the fields of a flow ID 1541, an operational item ID 1542, and an execution sequence 1543. The flow ID 1541 stores a flow ID. The operational item ID 1542 stores an operational item ID of an operational item that is included in a corresponded flow. For a record that is corresponded to a level-1 flow that is included in a level-0 flow, nothing is set to the operational item ID 1542. The execution sequence 1543 stores an execution sequence of a corresponded flow or an execution sequence of a corresponded operational item. In the case where nothing has been set to the operational item ID 1542 for instance, an execution sequence of a corresponded flow is stored. In the case where an operational item ID has been set to the operational item ID 1542 for instance, an execution sequence of an operational item that is included in a corresponded flow is stored.

In accordance with the three records from the top of the operational item mapping information 154 for instance, it is found that a flow that is provided with a flow ID of "flow1" is executed at first for a level-0 flow, a flow that is provided with a flow ID of "flow2" is executed secondarily, and a flow that is provided with a flow ID of "flow3" is executed third. Moreover, in accordance with three records of the sixth to eighth records from the top of the operational item mapping information 154 for instance, it is found that an operational item that is provided with an operational item ID of "item2-1" is executed at first for a flow that is provided with a flow ID of "flow2", an operational item that is provided with an operational item ID of "item2-2" is executed secondarily, and an operational item that is provided with an operational item ID of "item2-3" is executed third.

FIG. 14 is a view showing an example of the operator information in accordance with an embodiment of the present invention.

The operator information 130 is configured by a table for instance and is provided with a record that includes the fields of an operator ID 131, an operator name 132, and a skill level 133. The operator ID 131 stores an ID that identifies an operator (or a team thereof) (an operator ID). The operator name 132 stores a name of a corresponded operator (an operator name). The skill level 133 stores a skill level of a corresponded operator.

In accordance with the top record of the operator information 130 for instance, it is found that a name is "operator 1" and a skill level is "1" for an operator that is provided with an operator ID of "operator1".

FIG. 15 is a view showing an example of the operator allocation information in accordance with an embodiment of the present invention.

The operator allocation information 155 is configured by a table for instance and is provided with a record that includes the fields of a flow ID 1551 and an operator ID 1552. The flow ID 1551 stores a flow ID. The operator ID 1552 stores an operator ID of an operator to which a flow of a corresponded flow ID has been allocated.

In accordance with the top record of the operator allocation information 155 for instance, it is found that an operator that is provided with an operator ID of "operator1" has been allocated to a flow that is provided with a flow ID of "flow1" as a charged subject.

Figure 16:
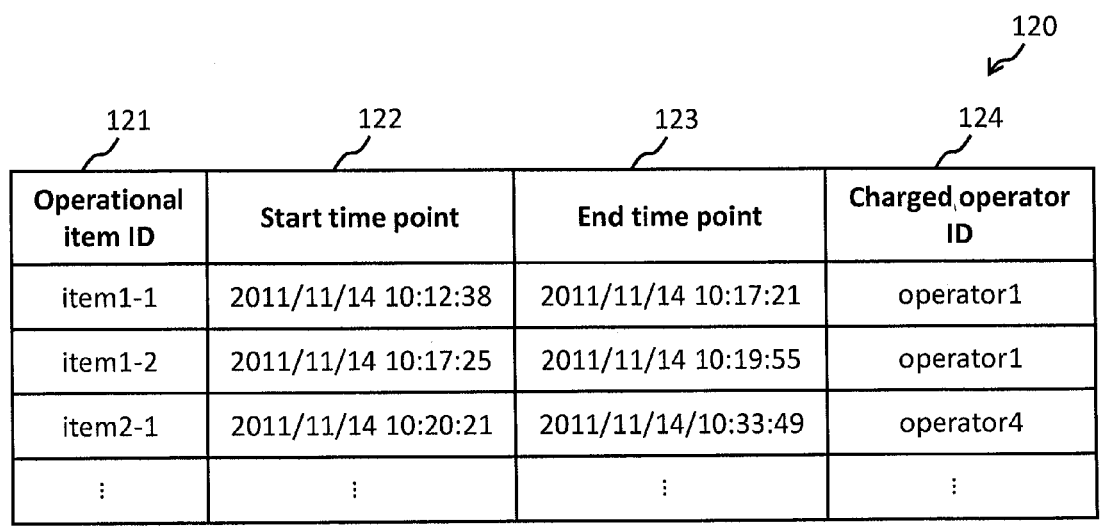
FIG. 16 is a view showing an example of the operational log information in accordance with an embodiment of the present invention.

FIG. 16 is a view showing an example of the operational log information in accordance with an embodiment of the present invention.

The operational log information 120 is configured by a table for instance and is provided with a record that includes the fields of an operational item ID 121, a start time point 122, an end time point 123, and a charged operator ID 124. The operational item ID 121 stores an operational item ID of an operational item that is corresponded to the record. The start time point 122 stores a point of time when a work of an operational item of a corresponded operational item ID was started. The end time point 123 stores a point of time when a work of an operational item of a corresponded operational item ID was ended. In the case where a work of an operational item of a corresponded operational item ID has not been ended, a field of the end time point 123 is empty. The charged operator ID 124 stores an operator ID of an operator who is in charge of an operational item of a corresponded operational item ID.

In accordance with the top record of the operational log information 120 for instance, it is found that an operational item that is provided with an operational item ID of "item1-1" was started at "2011/11/14 10:12:38" and was ended at "2011/11/14 10:17:21", and an operator that is provided with an operator ID of "operator 1" is in charge of the operational item.

FIG. 17 is a view showing an example of the icon progress display information in accordance with an embodiment of the present invention.

The icon progress display information 140 is configured by a table for instance and is provided with a record that includes the fields of a flow ID 141, an operational item ID 142, an icon display color 143, and a display method 144. Each of the records is corresponded to each of icons (image parts) that indicate an operational item. The flow ID 141 stores a flow ID of a corresponded flow. The operational item ID 142 stores a corresponded operational item ID. In the case where the record is corresponded to an icon that indicates a flow of a level 0, nothing is stored into the operational item ID. The icon display color 143 stores a display color (yellow, blue, red or the like) that is displayed on a corresponded icon. The display method 144 stores a display method (such as lighting and blinking) of a corresponded icon.

In accordance with the top record of the icon progress display information 140 for instance, it is found that a display color that is displayed on an icon that indicates a flow that is provided with a flow ID of "flow1" is yellow and the icon is displayed by blinking. In accordance with the second record from the top of the icon progress display information 140 for instance, it is found that a display color that is displayed on an icon that indicates an operational item that is provided with an operational item ID of "item1-1" for a flow that is provided with a flow ID of "flow1" is blue and the icon is displayed by blinking.

In accordance with the icon progress display information 140, a manager can comprehend whether an execution of each operational item has been terminated or is in the process and how much an execution of each operational item is delayed without any difficulty and in an appropriate manner. Moreover, since an operational item that is subject to be delayed can be comprehended, the icon progress display information 140 can be used as a source for considering an improvement measurer of such a flow.

A screen that is displayed by the management computer in accordance with the present embodiment and the contents thereof will be described in the next place.

Figure 18:
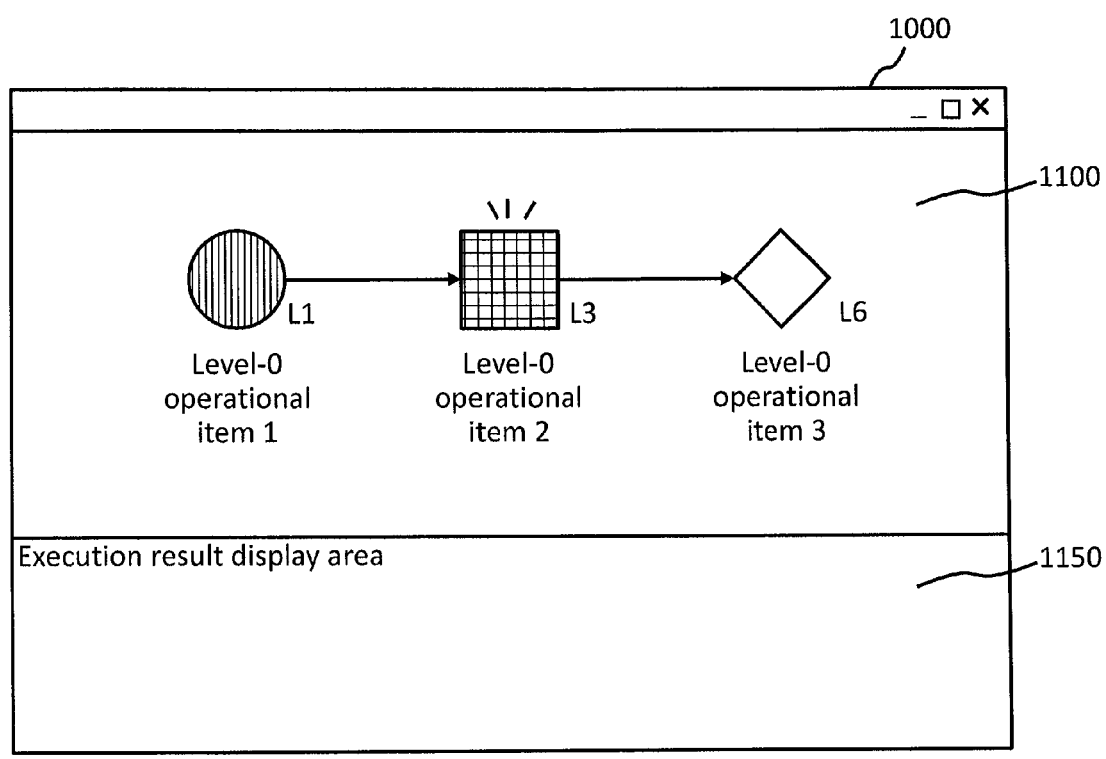
FIG. 18 is a view showing an example of the flow display screen in accordance with an embodiment of the present invention.

FIG. 18 is a view showing an example of the flow display screen in accordance with an embodiment of the present invention.

The flow display screen 1000 is provided with a flow display area 1100 that indicates a status of a flow that is being executed and an execution result display area 1150 that indicates a result of an execution by using an icon that indicates at least one operational item that is included in a flow that is being executed (of a tier next below of a flow). The example of the figure shows a condition in which the flow display area 1100 displays an operational item (a sub flow in this case) immediately below a flow of the highest level (a level-0 flow). A display method of a level-0 flow will be described in the following.

Figure 19:
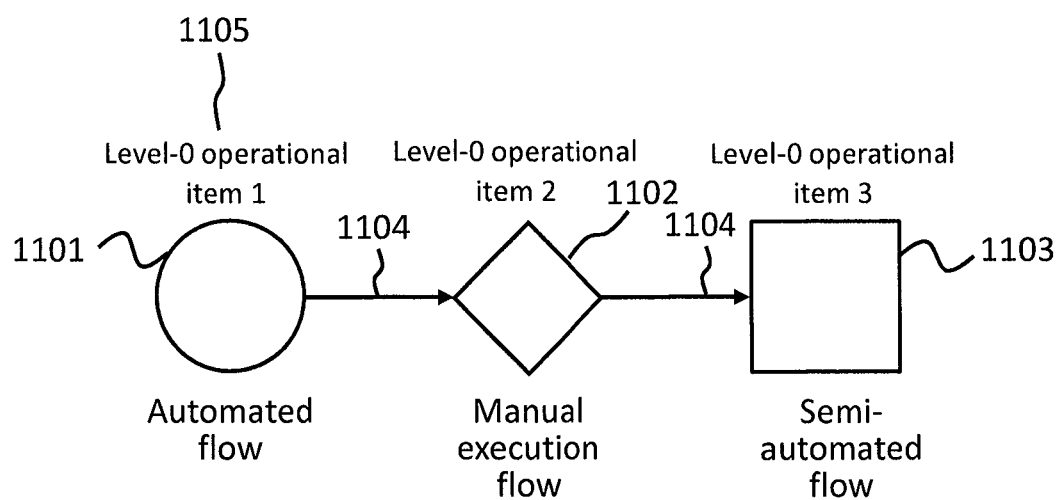
FIG. 19 is a view showing an example of a display method of a level-0 flow in accordance with an embodiment of the present invention.

FIG. 19 is a view showing an example of a display method of a level-0 flow in accordance with an embodiment of the present invention. This figure is a display example of a level-0 flow that is displayed in a flow display area 1100 of the flow display screen 1000 that is being executed.

Here, the tier that is immediately below a level-0 flow includes three operational items of an operational item 1, an operational item 2, and an operational item 3. The three operational items are executed in this order. The operational item 1 is an automated flow, the operational item 2 is a manual execution flow, and the operational item 3 is a semi-automated flow.

In this case, in the flow display area 1000, an icon 1101 that indicates the operational item 1, an icon 1102 that indicates the operational item 2, and an icon 1103 that indicates the operational item 3 are arranged in a transverse direction to be displayed in accordance with an execution sequence of the operational items in an order from the left side, the icon 1101 and the icon 1102 are coupled to each other by an arrow 1104 that indicates a flow of an execution sequence, and the icon 1102 and the icon 1103 are also coupled to each other by an arrow 1104.

The icon 1101 that indicates the operational item 1 is in a shape that indicates an automated flow that is a type of the operational item (in the present embodiment, a circular shape for instance). The icon 1102 that indicates the operational item 2 is in a shape that indicates a manual execution flow that is a type of the operational item (in the present embodiment, a rhombic shape for instance). The icon 1103 that indicates the operational item 3 is in a shape that indicates a semi-automated flow that is a type of the operational item (in the present embodiment, a rectangular shape for instance). At a predetermined location near the icon 1101, the icon 1102, and the icon 1103 (for instance, immediately below the icon), a type of the operational item that is indicated by the icon can also be displayed as a character.

Figure 20:
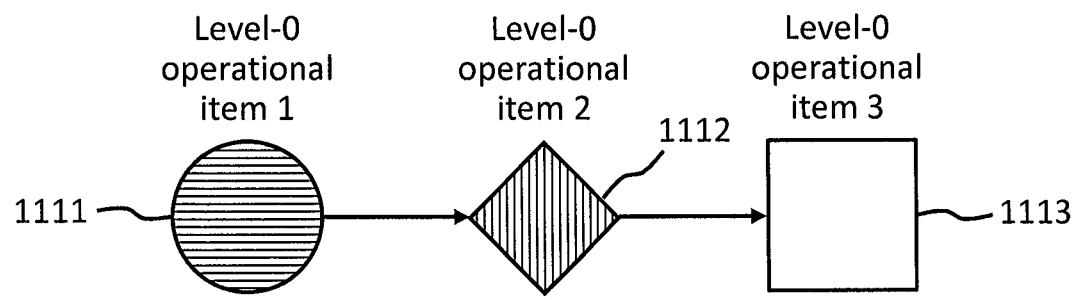
FIG. 20 is a view for illustrating an example of a modification method of a display color of an icon in accordance with an embodiment of the present invention.

FIG. 20 is a view for illustrating an example of a modification method of a display color of an icon in accordance with an embodiment of the present invention.

In the present embodiment, a display color of a corresponded icon is modified in accordance with an elapsed time of a work execution for an operational item based on an execution estimate time of each of the operational items. By this configuration, a manager or an operator can comprehend an execution situation of an operational item by a display color of an icon in an appropriate manner for instance.

In the present embodiment, in the case where an elapsed time from a start of a work of an operational item does not exceed a predetermined percentage (for instance, eight out of ten) of the execution estimate time, a display color of an icon that indicates the operational item is made to be a first color (for instance, blue, shown by a horizontal line pattern in the figure). In the case where an elapsed time from a start of a work of an operational item exceeds a predetermined percentage of the execution estimate time, a display color of an icon that indicates the operational item is made to be a second color (for instance, yellow, shown by a vertical line pattern in the figure). In the case where an elapsed time from a start of a work of an operational item exceeds the execution estimate time, a display color of an icon that indicates the operational item is made to be a third color (for instance, red, shown by a lattice pattern in the figure). A display color of an icon of an operational item in which a work has not been started is a default color (a color of a paper in the figure). In the present embodiment, in the case where a work of an operational item is being executed, a display color of a corresponded icon is blinked to be displayed. In the case where a work of an operational item has been terminated, a display color of a corresponded icon is in a lighted state as a display color at a point of time when a work is terminated.

In the figure, an icon 1111 of an operational item 1 is displayed by a blue color, an icon 1112 of an operational item 2 is displayed by a yellow color, and an icon 1113 of an operational item 3 is displayed by a default color. In the figure, the operational item 1 indicates that a processing has been terminated in a time within a predetermined percentage of the execution estimate time, the operational item 2 indicates that an elapsed time from a start of a work exceeds a predetermined percentage of the execution estimate time, and the operational item 3 indicates that a work has not been started. As described above, a manager or an operator can comprehend an execution situation of an operational item by a display color of an icon without any difficulty and in an appropriate manner for instance.

Figure 21:
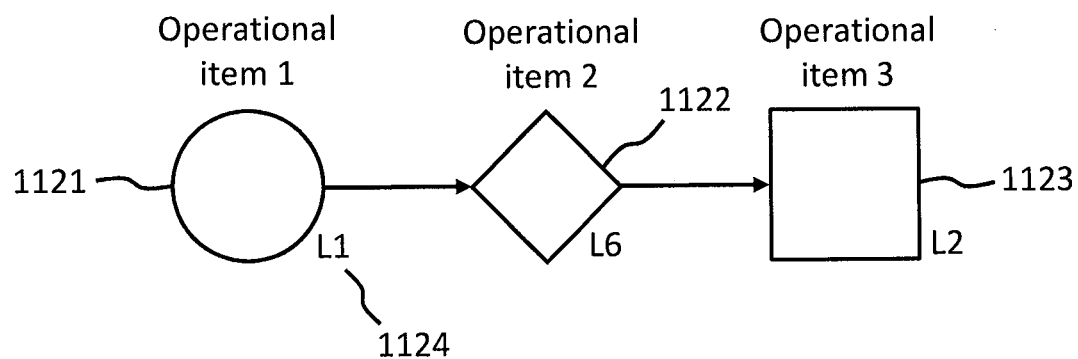
FIG. 21 is a view showing an example of a display method of a skill level in accordance with an embodiment of the present invention.

FIG. 21 is a view showing an example of a display method of a skill level in accordance with an embodiment of the present invention.

In the present embodiment, as shown in the figure, a skill level 1124 that is required for a work of an operational item is arranged and displayed at a predetermined location near the icon 1121, the icon 1122, and the icon 1123 that indicate the operational item (in the figure, at a location of the lower right of the icon). By this configuration, a manager or an operator can comprehend a skill level that is required for a work of an operational item that is corresponded to an icon without any difficulty and in an appropriate manner for instance.

Figure 22:
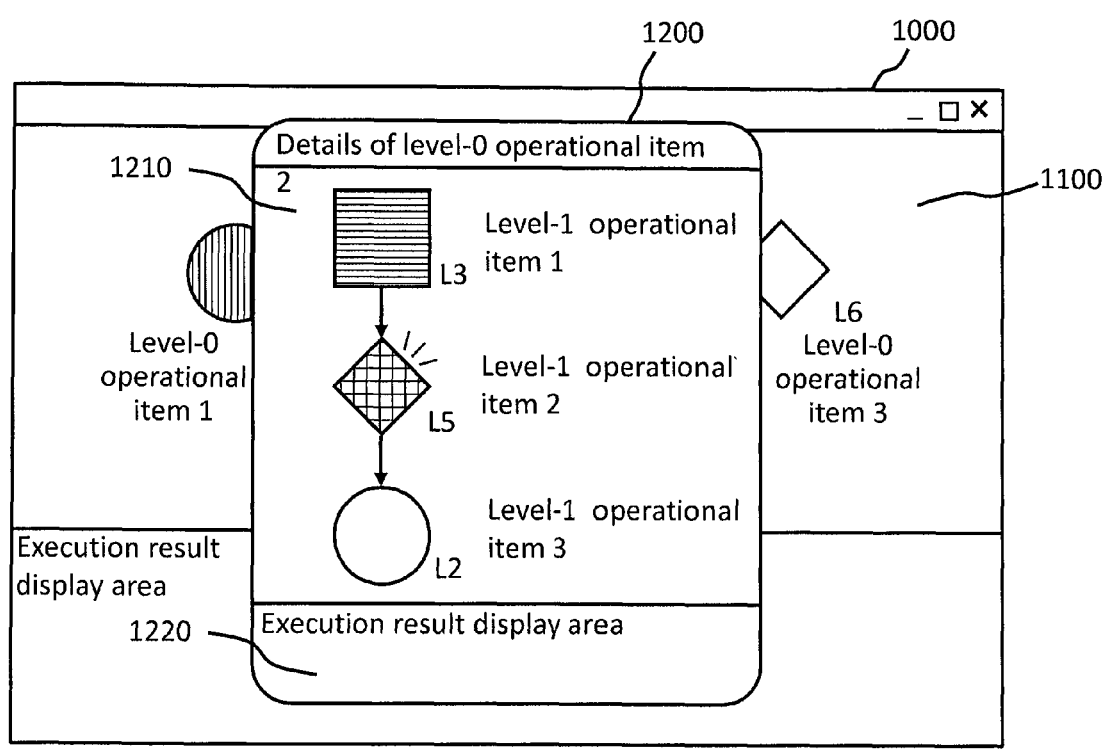
FIG. 22 is a view showing an example of the sub flow display screen in accordance with an embodiment of the present invention.

FIG. 22 is a view showing an example of the sub flow display screen in accordance with an embodiment of the present invention.

The sub flow display screen 1200 is a screen that is displayed by an occurrence of a click operation of a manager or an operator to an icon that indicates an operational item for the flow display screen 1000 shown in FIG. 18.

The sub flow display screen 1200 is provided with a sub flow display area 1210 that indicates a status of a sub flow by using an icon that is included in the sub flow, that is, an icon that indicates a plurality of operational items of a tier next below to a sub flow and an execution result display area 1220 that indicates a result of an execution. As an example of a sub flow, a display method of a level-1 flow will be described in the following.

Figure 23:
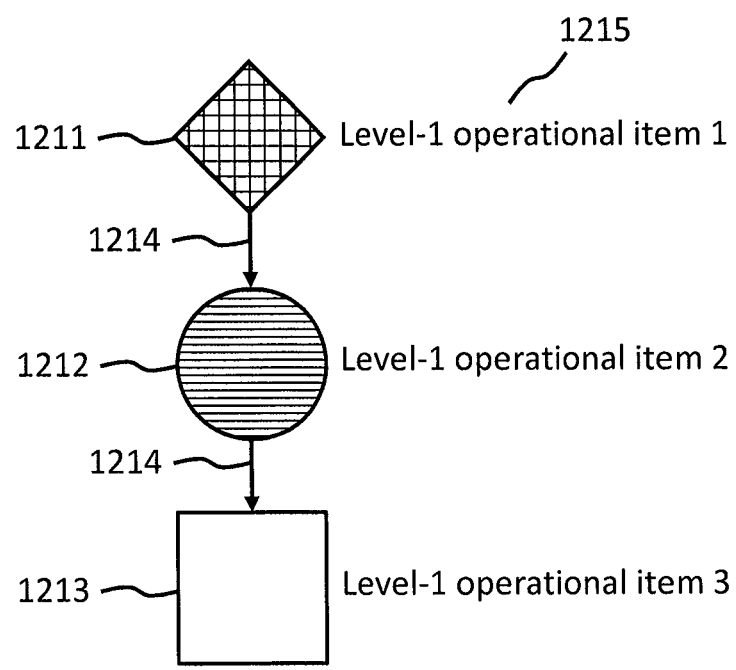
FIG. 23 is a view showing an example of a display method of a level-1 flow in accordance with an embodiment of the present invention.

FIG. 23 is a view showing an example of a display method of a level-1 flow in accordance with an embodiment of the present invention.

Here, the tier that is immediately below a level-1 flow includes three operational items of an operational item 1, an operational item 2, and an operational item 3. The three operational items are executed in this order. The operational item 1 is a manual execution flow, the operational item 2 is an automated flow, and the operational item 3 is a semi-automated flow.

In this case, in the sub flow display area 1210, an icon 1211 that indicates the operational item 1, an icon 1212 that indicates the operational item 2, and an icon 1213 that indicates the operational item 3 are arranged in a vertical direction to be displayed in accordance with an execution sequence of the operational items in an order from the top, the icon 1211 and the icon 1212 are coupled to each other by an arrow 1214 that indicates a flow of an execution sequence, and the icon 1212 and the icon 1213 are also coupled to each other by an arrow 1214 that indicates a flow of an execution sequence.

The icon 1211 that indicates the operational item 1 is in a shape that indicates a manual execution flow that is a type of the operational item (in the present embodiment, a rhombic shape for instance). The icon 1212 that indicates the operational item 2 is in a shape that indicates an automated flow that is a type of the operational item (in the present embodiment, a circular shape for instance). The icon 1213 that indicates the operational item 3 is in a shape that indicates a semi-automated flow that is a type of the operational item (in the present embodiment, a rectangular shape for instance). The shapes that are corresponded to a type of the operational item of an icon for a sub flow of a level-1 flow or the like as described above are equivalent to those of a level-0 flow. At a predetermined location near the icon 1211, the icon 1212, and the icon 1213 (for instance, on the right side of the icon) for the sub flow display area 1210, the contents 1215 of the operational item that is indicated by the icon can also be displayed. Moreover, at a predetermined location near the icon 1211, the icon 1212, and the icon 1213 (for instance, the lower right of the icon) for the sub flow display area 1210, a skill level 1 that is required for a work of the corresponded operational item can also be displayed.

Since a shape of an icon is modified in accordance with a type of an operational item as described above, a type of an operational item can be comprehended from a shape of an icon without any difficulty and in an appropriate manner.

In the present embodiment, in the case where a click operation of a manager or an operator occurs to an icon that indicates an operational item that is a sub flow that is displayed in the sub flow display area 1210, the sub flow display screen 1200 similar to the above that is corresponded to the specified sub flow is displayed.

In the present embodiment, the operational items are arranged and displayed in a vertical direction for the sub flow display area 1210 as described above. This is because it is considered that the case where the number of operational items for a sub flow is increased is assumed, in this case, it is difficult to display all operational items of the sub flow at the same time and an operation for confirming those is required. That is to say, it is considered that it is necessary that a display area in a screen is scrolled in the case where all operational items of the sub flow cannot be displayed at the same time, and a scrolling operation in a vertical direction is easier in a general way for a display computer. Since the operational items are arranged in a vertical direction as described above, a desired operational item can be confirmed without any difficulty even if there are a comparatively large number of operational items.

Figure 24:
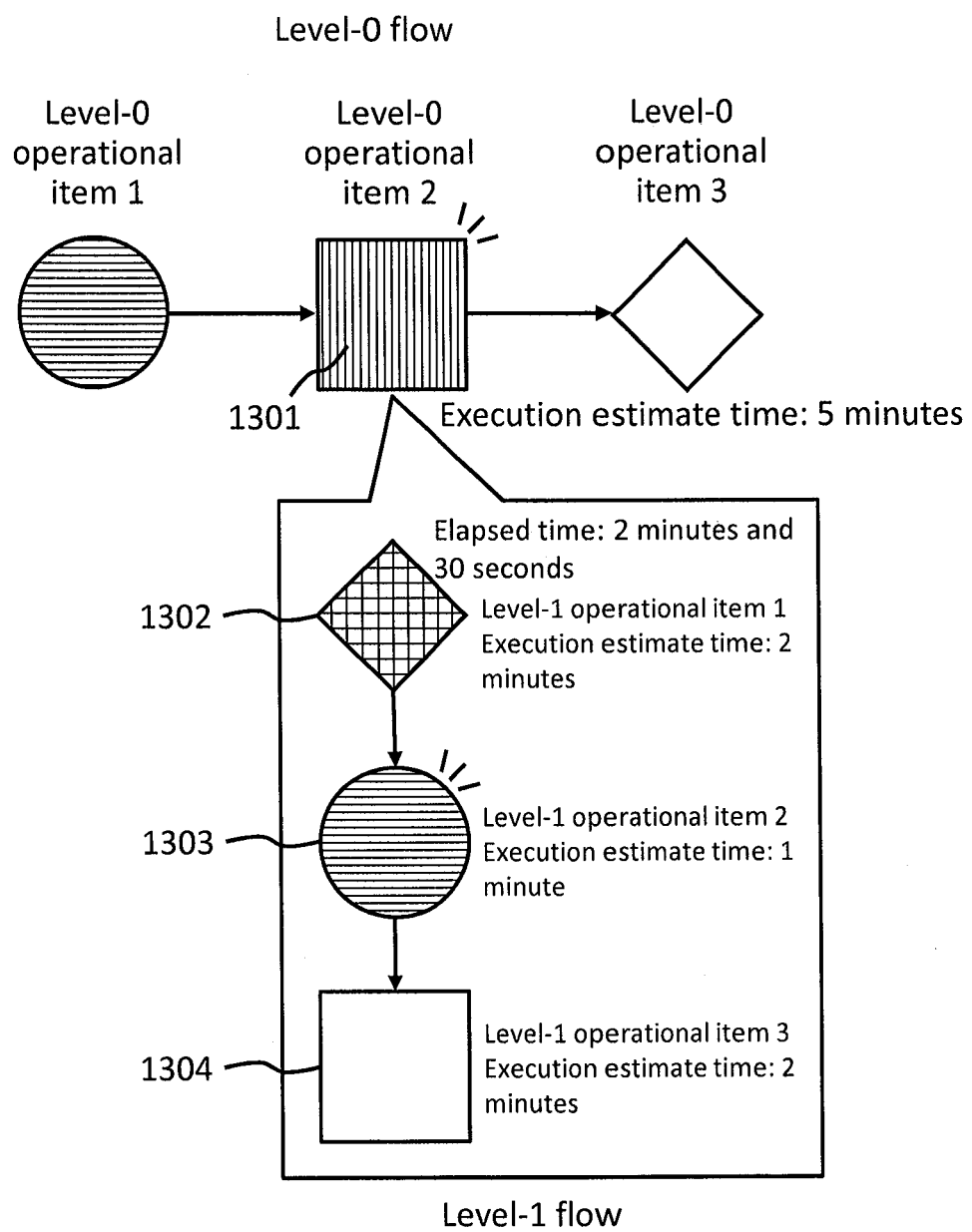
FIG. 24 is a view showing an example of a display color of an operational item of a level-0 flow in accordance with an embodiment of the present invention.

FIG. 24 is a view showing an example of a display color of an operational item of a level-0 flow in accordance with an embodiment of the present invention.

The figure shows a display example of a status of a level-0 flow and an operational item 2 of a level-0 flow (level-0 operational item 2: level-1 flow). Here, the level-0 operational item 2 is a semi-automated flow, and the level-0 operational item 2 includes three operational items of a level-1 operational item 1, a level-1 operational item 2, and a level-1 operational item 3. A type of the level-1 operational item 1 is a manual execution flow, a type of the level-1 operational item 2 is an automated flow, and a type of the level-1 operational item 3 is a semi-automated flow.

As shown in the figure, an icon that indicates an operational item of a level-0 flow is arranged in a transverse direction to be displayed. The icons 1302, 1303, and 1304 that indicate a level-0 operational item 2, that is, each of the operational items of a level-1 flow is arranged in a vertical direction to be displayed.

For a level-0 flow, a display color of an icon that indicates each of the operational items is decided based on an execution estimate time and an elapsed time from a start of a work for each of the operational items. For instance, since an execution estimate time is elapsed and terminated for the icon 1302 that indicates a level-1 operational item 1, a red color is lighted to display the icon. Since a corresponded work is executed and an elapsed time from a start of a work of an operational item exceeds 80 percent of the execution estimate time for the icon 1303 that indicates a level-2 operational item 2, a yellow color is blinked to be displayed.

In this case, a display color of an icon 1301 that indicates the level-0 operational item 2 is not determined by a color of the icons 1302, 1303, and 1304 of a corresponded level-1 flow, but is determined based on the execution estimate time (5 minutes in the figure) for the entire of the level-0 operational item 2 and an elapsed time (2 minutes and 30 seconds in the figure) from a work start of the level-0 operational item 2 (more specifically, a start of an operational item 1 the level-1 flow). In other words, since an elapsed time is 2 minutes and 30 seconds and is within 80 percent of the execution estimate time of 5 minutes in this case, a blue color is blinked to be displayed for the icon 1301 that indicates a level-0 operational item 2.

As described above, since a display color of an icon that indicates a corresponded operational item is modified in accordance with a relationship between an execution estimate time and an elapsed time from a work start, an execution status of a corresponded operational item can be comprehended without any difficulty and in an appropriate manner based on a display color of an icon.

Figure 25:
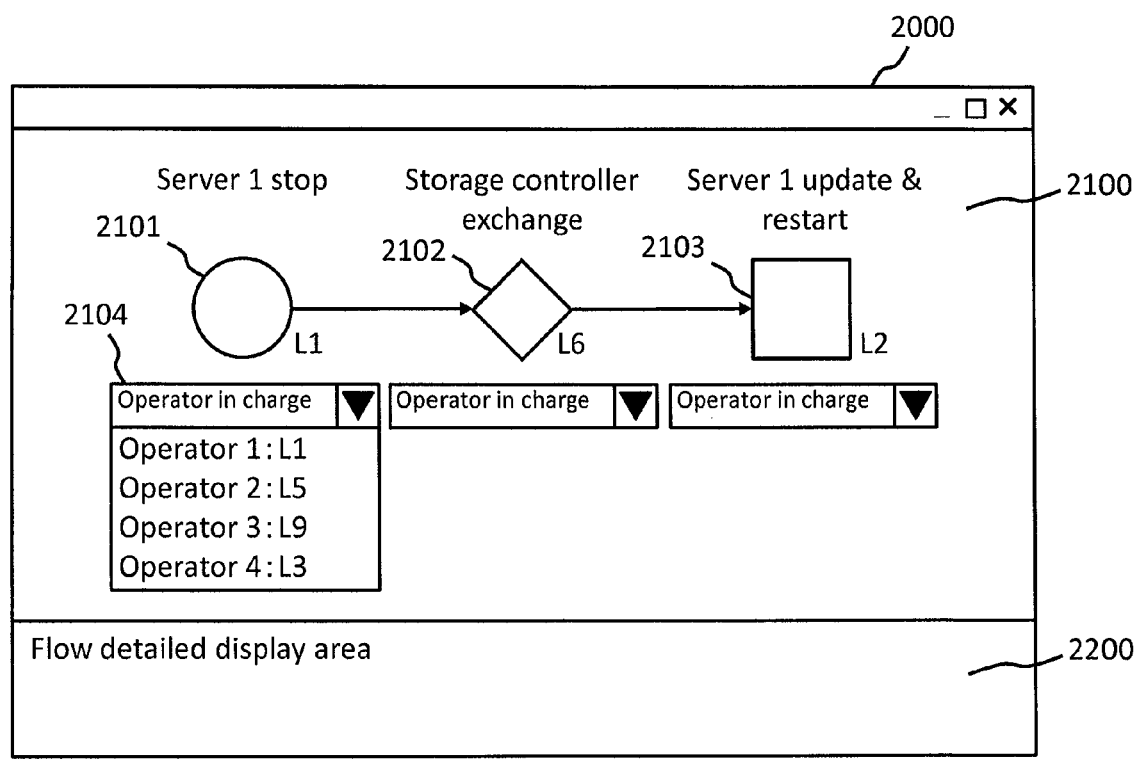
FIG. 25 is a view showing an example of an operator allocation screen in accordance with an embodiment of the present invention.

FIG. 25 is a view showing an example of an operator allocation screen in accordance with an embodiment of the present invention.

The operator allocation screen 2000 is provided with an operator allocation area 2100 and a flow detailed display area 2200 that is configured to display the detailed information of a flow. The icons 2101, 2102, and 2103 that indicate an operational item immediately below a corresponded level 0 are arranged to the operator allocation area 2100 in accordance with the execution sequence.

A shape of each of the icons 2101, 2102, and 2103 is a shape that is corresponded to a type of an operational item that is indicated by each of the icons. A name of a corresponded operational item is displayed on the upper side of each of the icons 2101, 2102, and 2103, and a request skill level for a corresponded operational item is displayed at the lower right of each of the icons.

A list box 2104 as an example of a GUI (Graphical User Interface) object that is configured to select an operator who is in charge of the operational item is arranged at a corresponded predetermined location of each of the icons 2101, 2102, and 2103 (here, on the lower side of the icon). In the present embodiment, at least one combination of an operator name that is a candidate and a skill level of the operator is displayed in the list box 2104.

In accordance with the operator allocation screen 2000, a manager comprehend a type of a flow (an automated flow, a manual execution flow, or a semi-automated flow) and a skill level that is required for executing the flow in a visual manner, whereby a visibility can be improved. By this configuration, since it is not necessary that a manager check a type of a flow, a degree of difficulty, and a skill level of an operator in a separate manner, a flow allocation work by a manager can be made more efficient and a load to a manager can be reduced. As a specific example, since a manager can comprehend a type of an operational item (flow) by using a shape of an icon, an operator can be allocated without any difficulty and in an appropriate manner in such a manner that an operator that is provided with a high skill level can be allocated to a manual execution flow in which a miss tends to occur for instance.

In an example that is shown in FIG. 25, the list box 2104 is displayed to an icon that indicates an operational item that is an automated flow and an operator in charge can be selected. This is because a management can be carried out by an operator as a corresponding person in the case where an error occurs although it is not necessary that an operator gets involved in an automated flow. Moreover, it is also possible that a list box for selecting an operator in charge is not displayed to an icon that indicates an operational item that is an automated flow and an operator in charge is not allocated to an automated flow.

An operation of the management system in accordance with the present embodiment will be described in the following.

Figure 26:
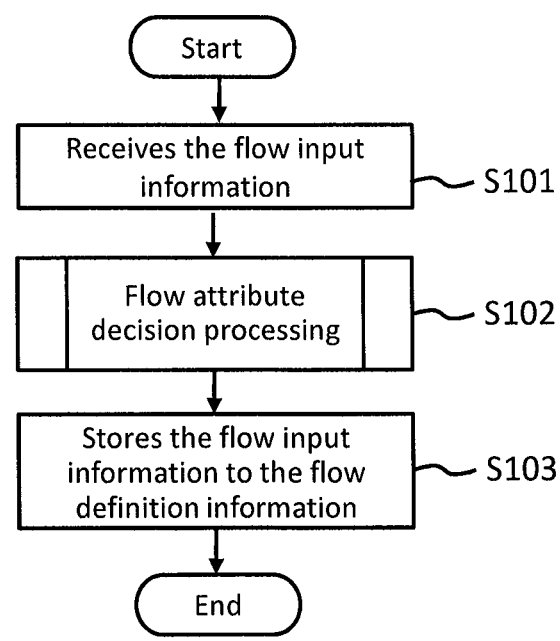
FIG. 26 is a flowchart of a flow registration processing in accordance with an embodiment of the present invention.

FIG. 26 is a flowchart of a flow registration processing in accordance with an embodiment of the present invention.

The flow registration processing is a processing that is executed in a unit of one flow. In the case where the total flow includes a plurality of sub flows, the flow registration processing is a processing that is executed for each of the sub flows.

The management program 110 of the management computer 100 (more specifically, a CPU 101 that executes the management computer 100) receives the flow input information from the display computer 200 (step S101). Here, the flow input information is the information that is created based on an operation of an input device of a manager for the display computer 200 for a manager and that is transmitted to the management computer 100 from the display computer 200. Moreover, the flow input information is the information that is required to be configured by a manager in the flow definition information 150.

As the flow input information, there can be mentioned for instance the information that can identify a flow ID, a flow name, and a parent flow (a flow of an upper level) and the information that can identify an execution sequence with other flows of the same tier. Moreover, as the flow input information, there can be mentioned for instance the information that can identify an operational item ID, a processing content, an operational item name, and a parent flow, an operational item type, an execution estimate time, and a request skill level. For the display computer 200 for a manager, it is also possible that the flow input information is created by inputting a wide variety of information by a manager based on the template data that has been prepared in advance.

In the next place, the management program 110 executes a flow attribute decision processing (see FIG. 27) (step S102) and registers the information that has been decided by the flow attribute decision processing (an execution estimate time of a flow, a type of a flow, and a request skill level of a flow) and the flow input information to the flow definition information 150 (step S103). More specifically, the values based on the information that has been decided by the flow attribute decision processing and the flow input information are registered to each item of the flow detailed information 151, the operational item information 152, the operational item processing information 153, and the operational item mapping information 154.

Figure 27:
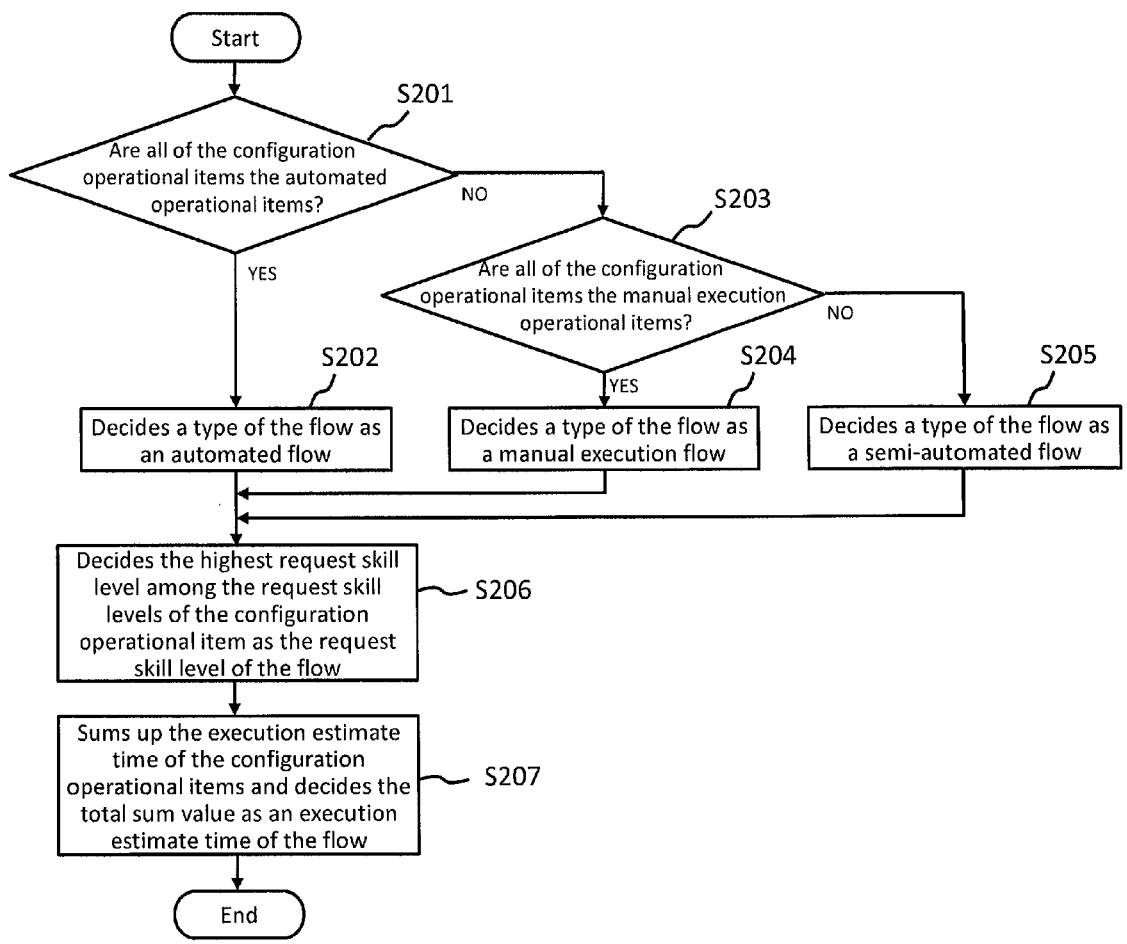
FIG. 27 is a flowchart of a flow attribute decision processing in accordance with an embodiment of the present invention.

FIG. 27 is a flowchart of a flow attribute decision processing in accordance with an embodiment of the present invention.

The flow attribute decision processing is a processing in which one sub flow is a processing target. The management program 110 determines whether or not all of the operational items that are included in a flow of a processing target (referred to as a configuration operational item in the descriptions of the present processing) are the automated operational items (step S201). As a result, in the case where all of the operational items that are included in a flow of a processing target are automated operational items (YES for the step S201), the management program 110 decides that a type of the flow is an automated flow (step S202) and goes ahead with the processing to the step S206. On the other hand, in the case where all of the operational items that are included in a flow of a processing target are not automated operational items (NO for the step S201), the management program 110 determines whether or not all of the configuration operational items are the manual execution operational items (step S203).

As a result, in the case where all of the configuration operational items are manual execution operational items (YES for the step S203), the management program 110 decides that a type of the flow is a manual execution flow (step S204) and goes ahead with the processing to the step S206. On the other hand, in the case where all of the configuration operational items are not manual execution operational items (NO for the step S203), since it is indicated that a manual execution operational item and an automated operational item are included, the management program 110 decides that a type of the flow is a semi-automated flow (step S205) and goes ahead with the processing to the step S206.

In the step S206, the management program 110 decides the highest request skill level among the request skill levels to the configuration operational item as the request skill level of the flow. In the next place, the management program 110 sums up the execution estimate time to each of the configuration operational items, decides the total sum value as an execution estimate time of the flow (step S207), and returns a type of a flow, a request skill level, and an execution estimate time that have been decided as a return value.

Figure 28:
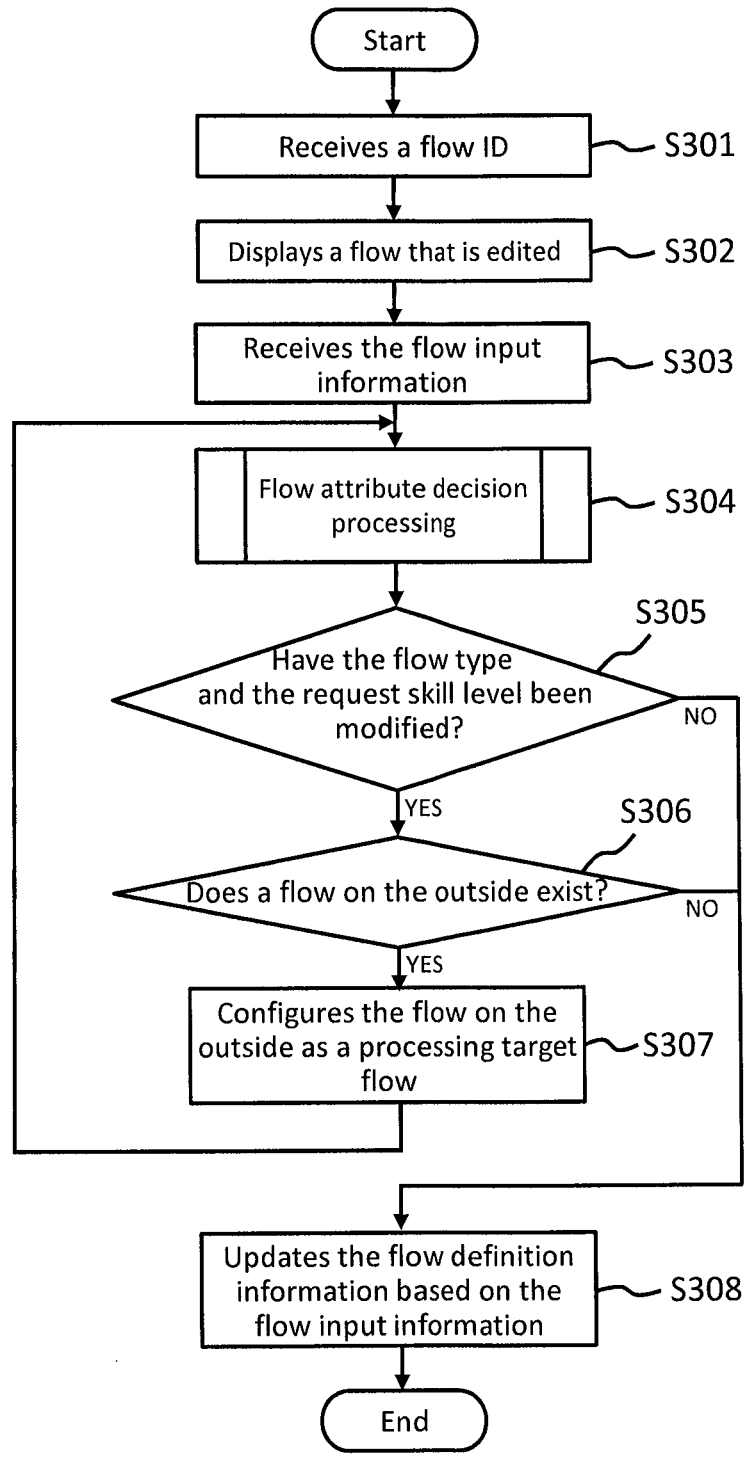
FIG. 28 is a flowchart of a flow update processing in accordance with an embodiment of the present invention.

FIG. 28 is a flowchart of a flow update processing in accordance with an embodiment of the present invention.

The flow update processing is a processing that is executed in the case where a created flow is modified. In the case where the management program 110 receives a flow ID of a flow of an edit target from the display computer 200 for a manager (step S301), the management program 110 displays a wide variety of information of a flow that is corresponded to the display computer 200 for a manager by transmitting the display information that is configured to display a wide variety of information of a flow that is corresponded to the flow ID to the display computer 200 for a manager (step S302).

In the next place, the management program 110 receives the flow input information that has been created based on an operation of an input device of a manager to the display computer 200 for a manager and that includes the contents that have been edited for a flow (step S303).

In the next place, the management program 110 executes the flow attribute decision processing (see FIG. 27) (step S304). In accordance with the flow attribute decision processing, a flow type, a request skill level, and an execution estimate time for the flow that has been edited are returned as a return value.

In the next place, the management program 110 determines whether or not the flow type and the request skill level have been modified (step S305). In the case where the flow type and the request skill level have not been modified (NO for the step S305), the management program 110 goes ahead with the processing to the step S308. On the other hand, in the case where the flow type and the request skill level have been modified (Yes for the step S305), the management program 110 goes ahead with the processing to the step S306.

In the step S306, the management program 110 determines whether or not a flow on the outside, that is, a flow of a tier next above that includes the flow exists. In the case where a flow on the outside does not exist (NO for the step S306), the management program 110 goes ahead with the processing to the step S308. On the other hand, in the case where a flow on the outside exists (YES for the step S306), since there is a possibility that a type of the flow on the outside and the request skill level are modified, the management program 110 goes ahead with the processing to the step S304 while configuring the flow on the outside as a processing target (step S307).

In the step S308, the management program 110 updates the values of items that corresponded for the flow detailed information 151, the operational item information 152, the operational item processing information 153, and the operational item mapping information 154 based on the information of a type of a flow, a request skill level, and an execution estimate time that have been decided by the flow attribute decision processing and the flow input information. In the case where the processing of the step S304 is executed for a plurality of flows, the information of a type of a flow, a request skill level, and an execution estimate time for the flows are reflected to the flow definition information 150.

Figure 29:
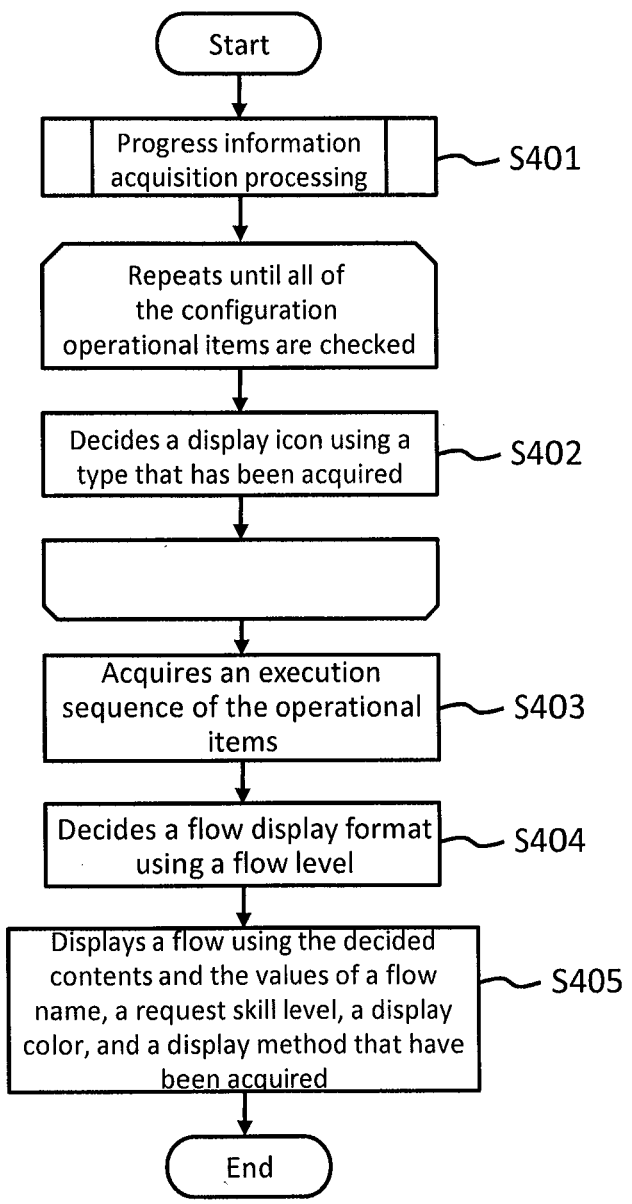
FIG. 29 is a flowchart of a display processing of a flow display screen in accordance with an embodiment of the present invention.

FIG. 29 is a flowchart of a display processing of a flow display screen in accordance with an embodiment of the present invention.

In the descriptions of this processing, a case where a flow display screen is displayed on the display computer 200 for a manager will be described as an example. However, a case where a flow display screen is displayed on the display computer 300 for an operator is equivalent to or similar to the case of the display computer 200 for a manager. In other words, the display computer 200 for a manager in the descriptions of the present processing can also be replaced by the display computer 300 for an operator.

The flow screen display processing is executed in the case where the management program 110 receives a flow screen display request that has been created based on an operation of an input device of a manager to the display computer 200 for a manager for instance. The flow screen display request includes a flow ID of a flow that is a display target for instance.

The management program 110 executes a progress information acquisition processing (see FIG. 31) while using a flow ID of the flow display screen display request as an argument (step S401). In accordance with the progress information acquisition processing, a display color of an icon that has been decided, a display method, and the flow information (a flow ID, a flow name, a flow level, an execution estimate time, an operational item ID of an operational item that is included, and an execution sequence of an operational item) are returned as a return value. In the next place, the management program 110 executes the processing of the step S402 in a repetitive manner until all of the operational items that configure a flow of a processing target (here, referred to as an operational item of a tier next below: a configuration operational item in the descriptions of this processing) are checked.

In the step S402, the management program 110 acquires a type of the operational item (an operational item type or a flow type) from the flow definition information 150 and identifies a shape of an icon that indicates the operational item based on the type.

After a check of all of the configuration operational items is terminated, the management program 110 refers to a return value of the progress information acquisition processing and acquires an execution sequence of each of the operational items (step S403).

In the next place, the management program 110 acquires a flow level of a flow of a processing target from a return value of the progress information acquisition processing and determines a flow display format, that is, whether icons of each of the operational items are arranged in a vertical direction or in a transverse direction based on the flow level (step S404). In the present embodiment here, the management program 110 determines that icons are arranged in a transverse direction in the case where the flow level is 0 and icons are arranged in a vertical direction in the case where the flow level is other than 0.

In the next place, the management program 110 creates the screen information that is configured to display the flow display screen based on the decided contents (a shape of an icon and a flow display format) and a return value of the progress information acquisition processing (an execution sequence of an operational item, a flow name, a request skill level, a display color, and a display method), and displays a flow display screen 1000 as shown in FIG. 18 for instance by transmitting the screen information to the display computer 200 for a manager (step S405).

Figure 30:
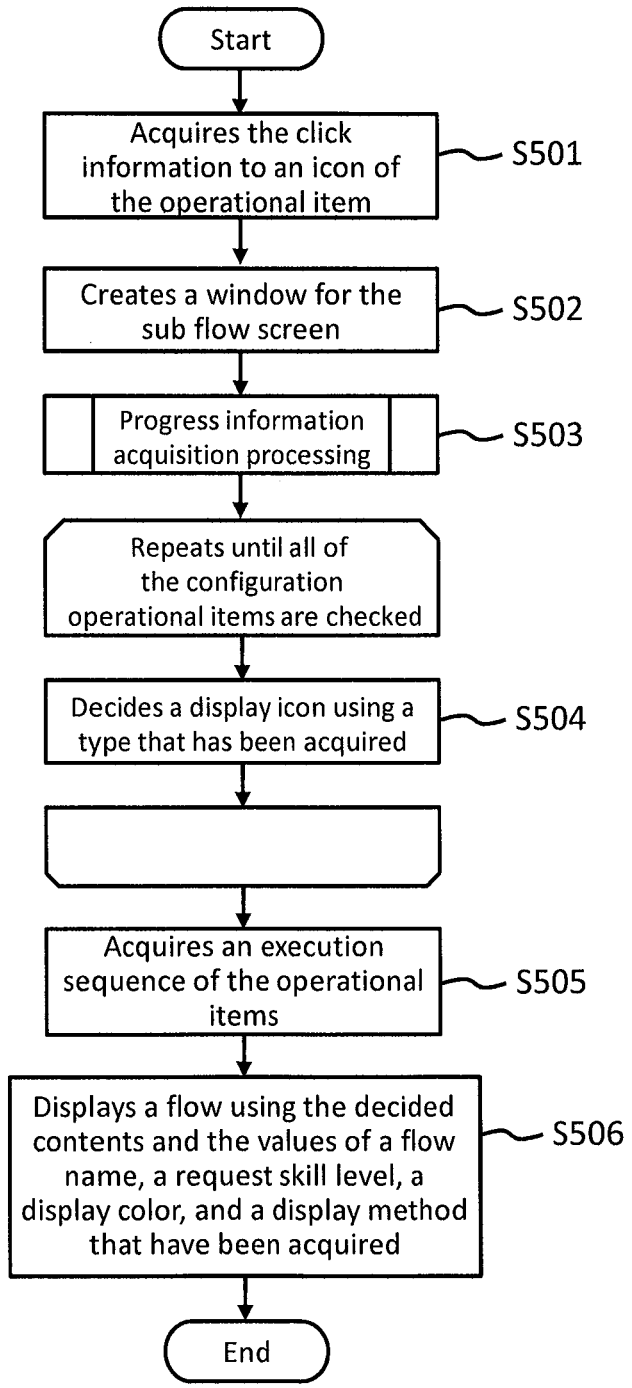
FIG. 30 is a flowchart of a display processing of a sub flow display screen in accordance with an embodiment of the present invention.

FIG. 30 is a flowchart of a display processing of a sub flow display screen in accordance with an embodiment of the present invention.

In the descriptions of this processing, a case where a sub flow display screen is displayed on the display computer 200 for a manager will be described as an example. However, a case where a sub flow display screen is displayed on the display computer 300 for an operator is equivalent to or similar to the case of the display computer 200 for a manager. In other words, the display computer 200 for a manager in the descriptions of the present processing can also be replaced by the display computer 300 for an operator.

In the sub flow screen display processing, the management program 110 receives the click information that is created and transmitted by the display computer 200 for a manager (step S501). For instance, the display computer 200 identifies an operational item in the flow display screen 1000 from an operation of an input device of a manager and a click to an icon of the operational item, identifies a flow ID that is corresponded to the icon, and transmits the flow ID as the click information.

In the next place, the management program 110 displays a window for the sub flow display screen on the display computer 200 for a manager (step S502), and executes a progress information acquisition processing (see FIG. 31) while using a flow ID of the click information as an argument (step S503). In accordance with the progress information acquisition processing, a display color of an icon that has been decided, a display method, and the flow information (a flow ID, a flow name, a flow level, an execution estimate time, an operational item ID of an operational item that is included, and an execution sequence of an operational item) are returned as a return value. In the next place, the management program 110 executes the processing of the step S504 in a repetitive manner until all of the operational items that configure a flow of a processing target (here, referred to as an operational item of a tier next below: a configuration operational item in the descriptions of this processing, and the configuration operational item includes a sub flow) are checked.

In the step S504, the management program 110 acquires a type of the operational item (an operational item type or a flow type) from the flow definition information 150 and identifies a shape of an icon that indicates the operational item based on the type.

After a check of all of the configuration operational items is terminated, the management program 110 refers to a return value of the progress information acquisition processing and acquires an execution sequence of each of the operational items (step S505).

In the next place, the management program 110 creates the screen information that is configured to display the sub flow display screen on the window that has been crated on the display computer 200 for a manager based on the decided contents (a shape of an icon) and a return value of the progress information acquisition processing (an execution sequence of an operational item, a flow name, a request skill level, a display color, and a display method), and displays a sub flow display screen 1200 as shown in FIG. 22 for instance by transmitting the screen information to the display computer 200 for a manager (step S506).

Figure 31:
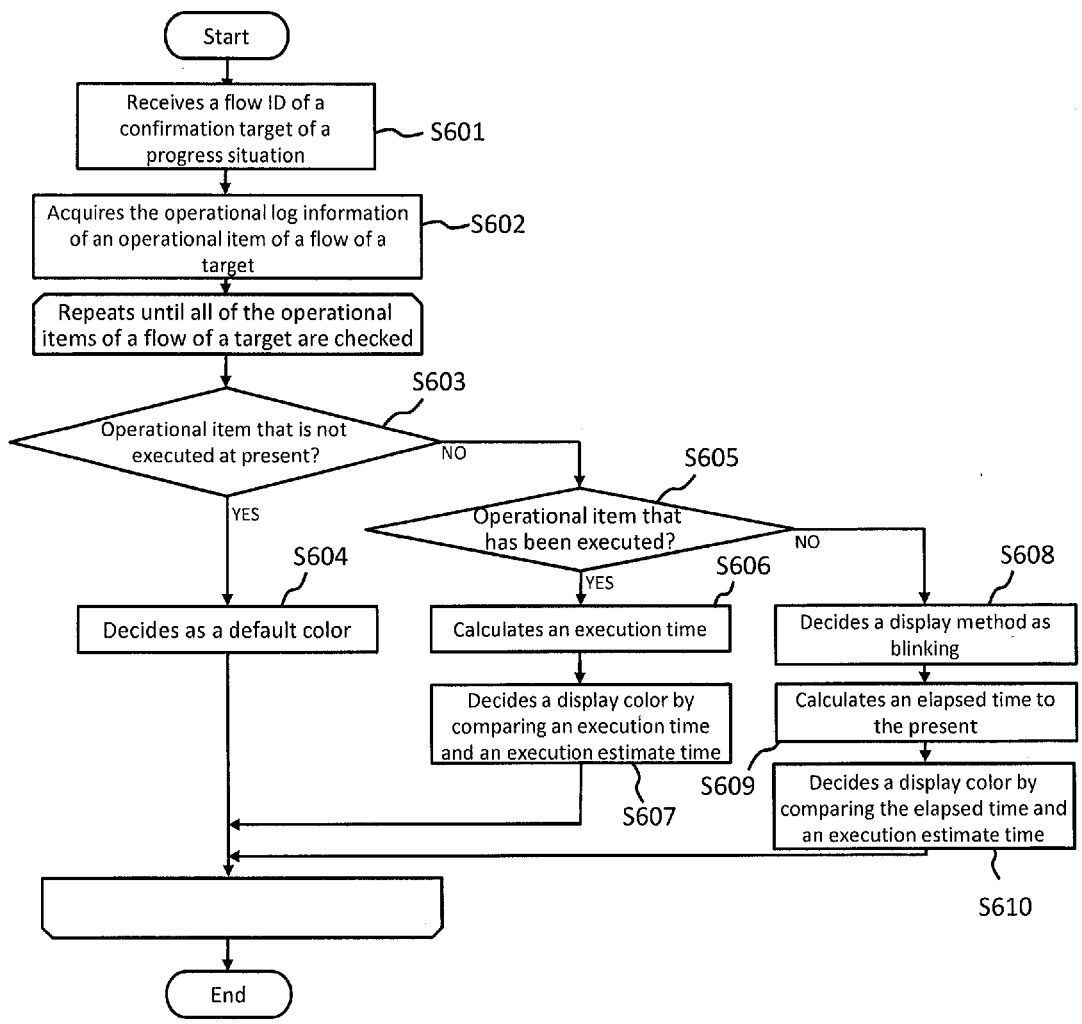
FIG. 31 is a flowchart of a progress information acquisition processing in accordance with an embodiment of the present invention.

FIG. 31 is a flowchart of a progress information acquisition processing in accordance with an embodiment of the present invention.

The management program 110 acquires a flow ID of a confirmation target of a progress situation that has been transferred as an argument, and acquires a flow name for a flow that is corresponded to a flow ID, a flow level, an execution estimate time, an operational item ID of an operational item that is included in a flow, and an execution sequence of an operational item from the flow definition information 150 based on the flow ID (step S601). Here, a group of a flow ID, a flow level, an execution estimate time, an operational item ID of an operational item that is included, and an execution sequence of an operational item is referred to as the flow information in the descriptions of this processing. In the next place, the management program 110 acquires a record that is corresponded to an operational item ID of an operational item that is included in a flow of a processing target that has been acquired from the operational log information 120 (step S602).

In the next place, the management program 110 executes the processing of the steps S603 to S610 in a repetitive manner until all of the operational items that are included in a flow of a processing target are checked as a target. Here, an operational item of a processing target of the steps S603 to S610 is referred to as a target operational item.

In the first place, the management program 110 determined whether or not a target operational item is an operational item that is not executed at present based on a record of the operational log information 120 (step S603). As a result, in the case where a target operational item is an operational item that is not executed at present (YES for the step S603), the management program 110 decides a color of an icon that indicates a target operational item as a default color (step S604) and terminates the processing to the target operational item.

On the other hand, in the case where a target operational item is not an operational item that is not executed at present (NO for the step S603), the management program 110 determined whether or not a target operational item is an operational item that has been executed (step S605).

As a result, in the case where a target operational item is an operational item that has been executed (YES for the step S605), the management program 110 calculates an execution time of a target operational item based on a record of the operational log information 120 (step S606). In the next place, the management program 110 decides a display color of a corresponded icon by comparing an execution time and an execution estimate time (step S607) and terminates the processing to the target operational item.

On the other hand, in the case where a target operational item is not an operational item that has been executed (NO for the step S605), the management program 110 decides a display method of an icon that indicates the target operational item as blinking (a default is always lighting) (step S608). In the next place, the management program 110 calculates an elapsed time from an execution start time point to the present based on a record of the operational log information 120 (step S609). In the next place, the management program 110 decides a display color of a corresponded icon by comparing the elapsed time and an execution estimate time (step S610) and terminates the processing to the target operational item.

After the check of all of the configuration operational items is terminated, the management program 110 returns a control to a processing for executing the progress information acquisition processing while configuring a display color that has been decided, a display method, and the flow information (a flow ID, a flow name, a flow level, an execution estimate time, an operational item ID of an operational item that is included, and an execution sequence of an operational item) as a return value.

Moreover, the management program 110 can also execute the progress information acquisition processing at a predetermined timing while configuring all of the operational items of the total flow as a target for instance and register a display color and a display method of each of the operational items that have been decided in the progress information acquisition processing that has been executed to the icon progress display information 140.

Figure 32:
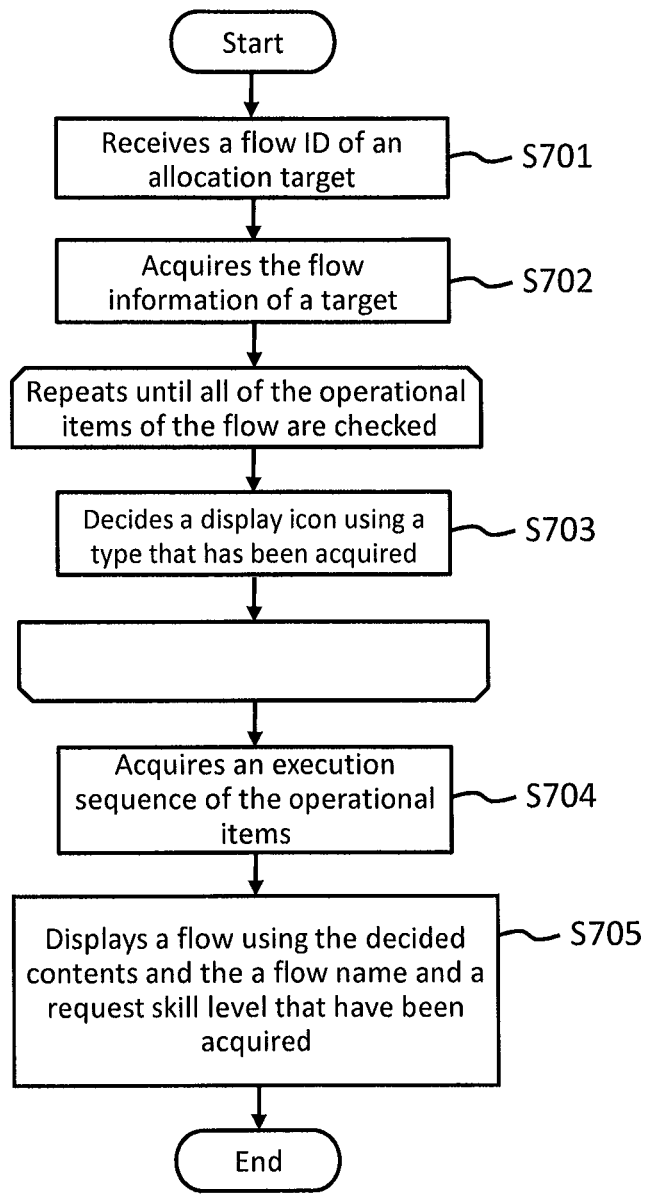
FIG. 32 is a flowchart of an operator allocation screen display processing in accordance with an embodiment of the present invention.

FIG. 32 is a flowchart of an operator allocation screen display processing in accordance with an embodiment of the present invention.

In the operator allocation screen display processing, the management program 110 receives an operator allocation request that is created and transmitted by the display computer 200 for a manager (step S701). For instance, the display computer 200 identifies a selection or a specification of a flow ID that indicates a flow of a target that executes an allocation of an operator from an operation of an input device of a manager, and transmits an operator allocation request that includes the flow ID.

The management program 110 acquires the flow information of the corresponded flow (a flow name, an ID (or a flow ID) of an operational item that is included in the flow, and a request skill level) using a flow ID that is included in the operator allocation request (step S702).

In the next place, the management program 110 executes the processing of the step S703 in a repetitive manner until all of the operational items that are included in the flow (here, referred to as a target operational item in the descriptions of this processing) are checked.

In the step S703, the management program 110 acquires a type of the operational item (an operational item type or a flow type) and identifies a shape of an icon that indicates the operational item based on the type.

After a check of all of the configuration operational items that are included in the flow is terminated, the management program 110 refers the operational item mapping information 140 and acquires an execution sequence of each of the operational items (step S704).

In the next place, the management program 110 creates the screen information that is configured to display the operator allocation screen on the display computer 200 for a manager based on the decided contents (a shape of an icon), an execution sequence that has been acquired, a flow name, and a request skill level that have been acquired, and displays an operator allocation screen 2000 as shown in FIG. 25 for instance by transmitting the screen information to the display computer 200 for a manager (step S705).

In the case where any one of the operators of a list box of the operator allocation screen 2000 is selected for the display computer 200 for a manager, the display computer 200 for a manager transmits an allocation request that includes an operational ID (or a flow ID) and an operator ID of an operator that has been selected. As a result, for the management computer 100, the management program 110 updates the operator allocation information 155 based on the allocation request that has been received.

Since a manager can select an operator that is to be allocated while referring to the operator allocation screen 2000, the manager can comprehend a type of an operational item by using a shape of an icon and can allocate an operator without any difficulty and in an appropriate manner in such a manner that an operator that is provided with a high skill level can be allocated to a manual execution flow in which a miss tends to occur for instance.

The present invention is not restricted to an embodiment in accordance with the present invention that has been described above, and it is obvious that various changes and modifications can be thus made without departing from the scope of the present invention.

In the above embodiment for instance, a shape of an icon of an operational item (including a sub flow) is different from each other depending on a type. However, it is also possible that a size of an icon is different from each other depending on a type or a color of an icon is different from each other depending on a type. Moreover, it is also possible that the combination of a size and a color is different from each other depending on a type. The point is that a type can be determined in a visual manner for an icon.

REFERENCE SIGNS LIST

1: Management system
2: Management target system
100: Management computer
200: Display computer for a manager
300: Display computer for an operator
400: Server computer
500: Storage apparatus
600: Communication network
610: Network apparatus

The invention claimed is:

1. An operational management method for managing an operational flow that is configured by a plurality of operational items, comprising the steps of:

storing the tier relationship information that indicates a tier relationship of the plurality of operational items that configure the operational flow, the execution sequence information that indicates an execution sequence of the plurality of operational items, and the operational item type information that indicates whether an operational item that is a lower end of a tier of the operational flow is an automated operational item that is executed only by a computer or a manual execution operational item that is executed via a human person in the process of an automated work of a computer;

determining whether an operational item of a tier that is upper than a tier of the lowest level includes only the automated operational item, only the manual execution operational item, or both of the automated operational item and the manual execution operational item for all tiers of the lower level based on the operational item type information and the tier relationship information; and when displaying an icon that indicates a plurality of operational items for the predetermined tier of the operational flow, locating an icon that indicates each of the plurality of operational items in accordance with the execution sequence based on the execution sequence information, in the case where an operational item that is indicated by the icon includes only the automated operational item, displaying the icon by a first icon that indicates that, in the case where an operational item that is indicated by the icon includes only the manual execution operational item, displaying the icon by a second icon that indicates that, and in the case where an operational item that is indicated by the icon includes the manual execution operational item and the automated operational item, displaying the icon by a third icon that indicates that.

2. The operational management method according to claim 1, further comprising the steps of:

when displaying a plurality of operational items of 0-th tier that is a tier of the highest level of the operational flow, locating in a transverse direction and displaying each of icons that indicate the plurality of operational items of the 0-th tier in accordance with an execution sequence based on the execution sequence information of the operational items; and in the case where a selection indication by a user is received to an icon that indicates any of the operational items and there is a plurality of operational items of the next tier below that is included in an operational item that is indicated by the icon, locating in a longitudinal direction and displaying each of icons that indicate the plurality of operational items in accordance with an execution sequence based on the execution sequence information of the operational items.

3. The operational management method according to claim 2, further comprising the steps of:

receiving an input of the charged subject information that is configured to identify a charged subject for the operational item from a user to at least one operational item for the 0-th tier; and storing the charged subject information and charged subject information to which the operational item is corresponded.

4. The operational management method according to claim 3, further comprising the steps of:

when displaying an icon that indicates the operational item of the 0-th tier, displaying a skill level that is necessary for a charged subject that is in charge of an execution of the operational item, and displaying a GUI object that is configured to select and input the charged subject of the operational item.

5. The operational management method according to claim 4, further comprising the step of:

inhibiting a display of the GUI object that is configured to select the charged subject to the operational item that includes only the automated operational item for the operational items of the 0-th tier.

6. The operational management method according to claim 5, further comprising the step of:

modifying a display color of an icon that indicates the operational item based on the correspondence relationship between an execution estimate time that is an estimate of an execution of the operational item and an elapsed time from a work start of the operational item.

7. The operational management method according to claim 6, further comprising the steps of:

in the case where the elapsed time is within a predetermined percentage of the execution estimate time, making a display color of an icon that indicates the operational item to be a first color;

in the case where the elapsed time exceeds a predetermined percentage of the execution estimate time, making a display color of an icon that indicates the operational item to be a second color; and in the case where the elapsed time exceeds the execution estimate time, making a display color of an icon that indicates the operational item to be a third color.

8. The operational management method according to claim 7, further comprising the steps of:

receiving a notice of a start and an end of a work of the operational item;

registering the notice to the log information that indicates a start time and/or an end time of an execution of the work of the operational item;

determining whether or not the work of the operational item of a display target is being executed based on the log information; and in the case where the work of the operational item is being executed, blinking the display color of an icon that indicates the operational item.

9. The operational management method according to claim 8, further comprising the steps of:

determining whether or not the work of the operational item of a display target has been terminated based on the log information; and in the case where the work of the operational item has been terminated, lighting the display color of an icon that indicates the operational item.

10. The operational management method according to claim 9, further comprising the steps of:

storing a result of the determination of whether an operational item of a tier that is upper than a tier of the lowest level includes only the automated operational item, only the manual execution operational item, or both of the automated operational item and the manual execution operational item for all tiers of the lower level corresponding to the operational item based on the operational item type information and the tier relationship information; and in the case where a predetermined modification occurs to an operational flow, storing a new result of the determination of whether an operational item of a tier that is upper than a tier of the lowest level includes only the automated operational item, only the manual execution operational item, or both of the automated operational item and the manual execution operational item for all tiers of the lower level corresponding to the operational item based on the operational item type information and the tier relationship information after the modification.

11. A management system comprising:
a storage device; and
a control device coupled to the storage device,
wherein the storage device is configured to store the tier relationship information that indicates a tier relationship of the plurality of operational items that configure an operational flow, the execution sequence information that indicates an execution sequence of the plurality of operational items, and the operational item type information that indicates whether an operational item that is a lower end of a tier of the operational flow is an automated operational item that is executed only by a computer or a manual execution operational item that is executed via a human person in the process of an automated work of a computer,
wherein the control device is configured to
  determine whether an operational item of a tier that is upper than a tier of the lowest level includes only the automated operational item, only the manual execution operational item, or both of the automated operational item and the manual execution operational item for all tiers of the lower level based on the operational item type information and the tier relationship information, and
  when displaying an icon that indicates a plurality of operational items for the predetermined tier of the operational flow,
    locate an icon that indicates each of the plurality of operational items in accordance with the execution sequence based on the execution sequence information,
    in the case where an operational item that is indicated by the icon includes only the automated operational item, display the icon by a first icon that indicates that,
    in the case where an operational item that is indicated by the icon includes only the manual execution operational item, display the icon by a second icon that indicates that, and
    in the case where an operational item that is indicated by the icon includes the manual execution operational item and the automated operational item, display the icon by a third icon that indicates that.

12. The management system according to claim 11,
wherein the control device is configured to
  in the case where a plurality of operational items of 0-th tier that is a tier of the highest level of the operational flow, locate in a transverse direction and display each of icons that indicate the plurality of operational items of the 0-th tier in accordance with an execution sequence based on the execution sequence information of the operational items, and
  in the case where a selection indication by a user is received to an icon that indicates any of the operational items and there is a plurality of operational items of the next tier below that is included in an operational item that is indicated by the icon, locate in a longitudinal direction and display each of icons that indicate the plurality of operational items in accordance with an execution sequence based on the execution sequence information of the operational items.

13. The management system according to claim 11,
wherein the control device is configured to
  receive an input of the charged subject information that is configured to identify a charged subject for the operational item from a user to at least one operational item for the 0-th tier that is a tier of the highest level of the operational flow, and
  store, in the storage device, the charged subject information and charged subject information to which the operational item is corresponded.

14. The management system according to claim 11,
wherein the control device is configured to
  when displaying an icon that indicates the operational item of 0-th tier that is a tier of the highest level of the operational flow, display a skill level that is necessary for a charged subject that is in charge of an execution of the operational item and display a GUI object that is configured to select and input the charged subject of the operational item.

15. The management system according to claim 11,
wherein the control device is configured to inhibit a display of the GUI object that is configured to select the charged subject to the operational item that includes only the automated operational item for the operational items of 0-th tier that is a tier of the highest level of the operational flow.

\* \* \* \* \*